Figure 1:
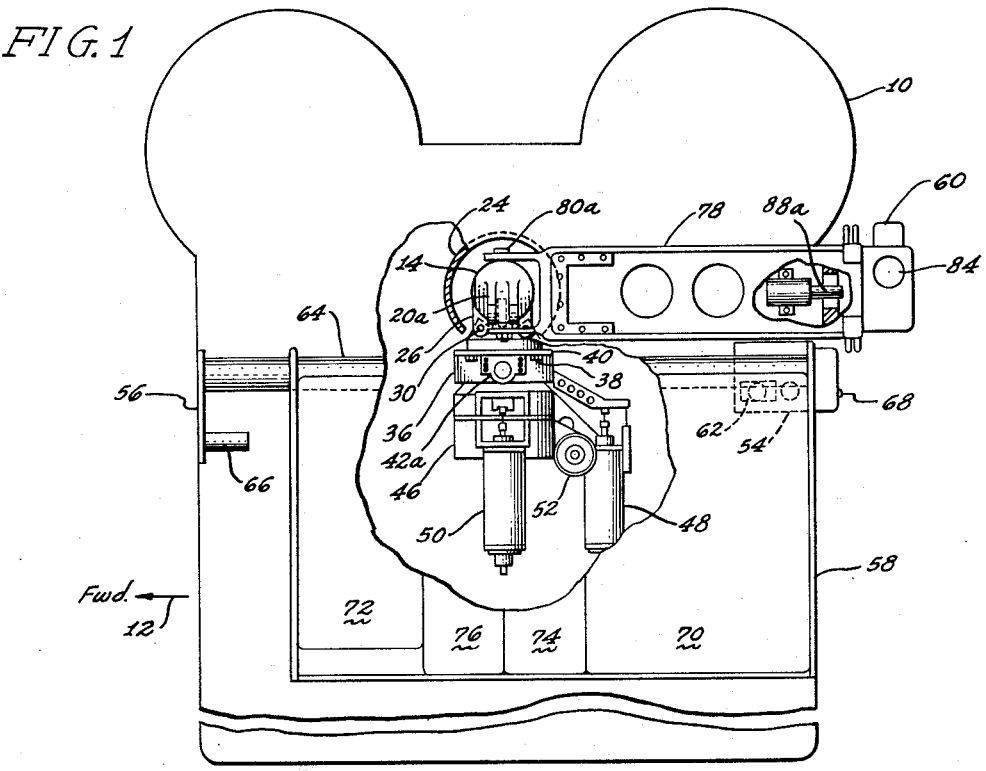

June 18, 1963 D. E. MOORS ET AL 3,094,054
CAMERA STABILIZED MOUNT
Filed Oct. 29, 1957 29 Sheets-Sheet 1

Donald E. Moors
Harry L. Sandberg
INVENTORS.

Attorney

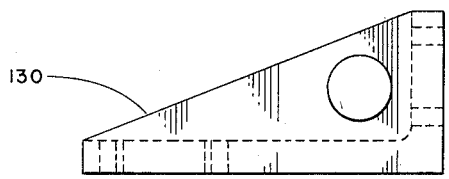
FIG. 3a
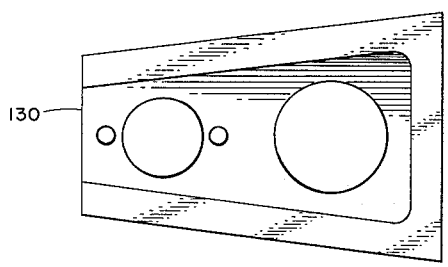
FIG. 3b
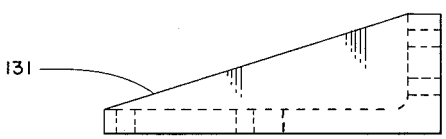
FIG. 3c
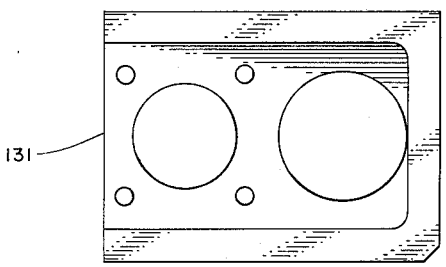
FIG. 3d
Donald E. Moors
Harry L. Sandberg
INVENTORS
ATTORNEY

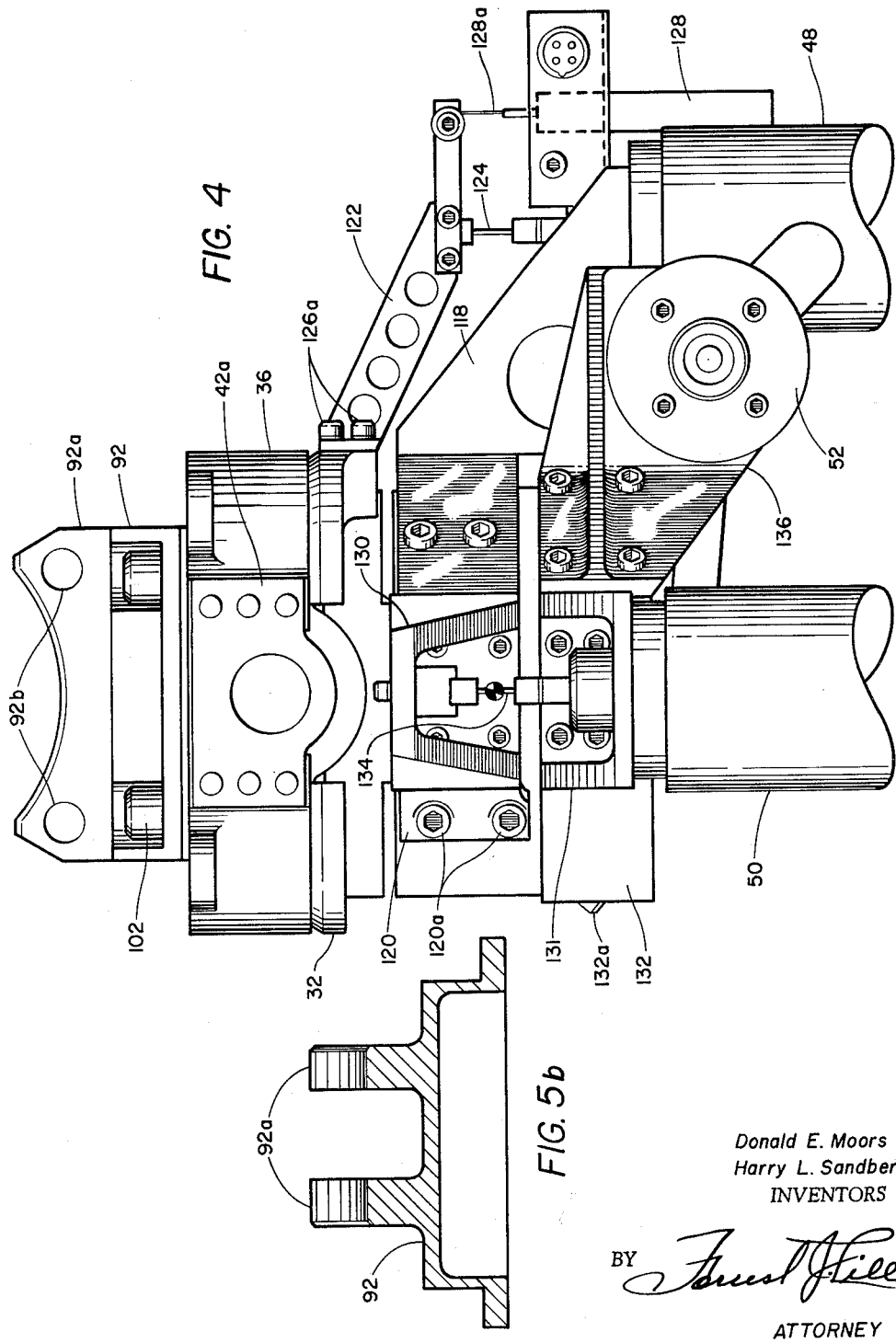

June 18, 1963  D. E. MOORS ET AL  3,094,054
CAMERA STABILIZED MOUNT
Filed Oct. 29, 1957  29 Sheets-Sheet 6
FIG. 4a
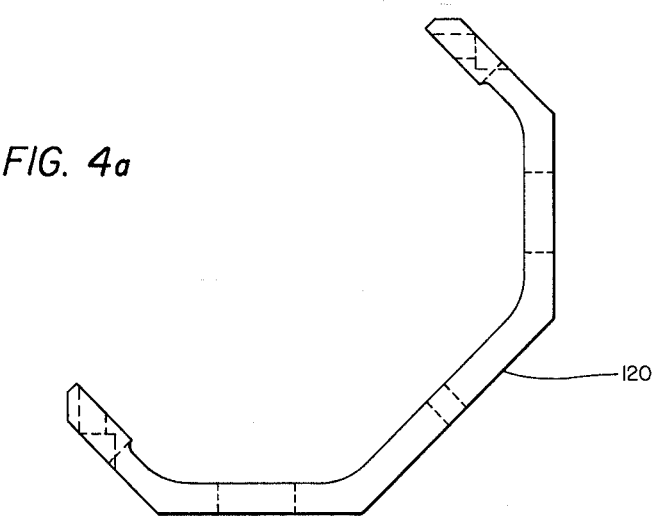
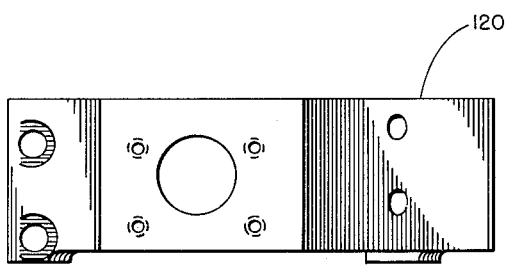
FIG. 4b
Donald E. Moors
Harry L. Sandberg
INVENTORS
BY 
ATTORNEY

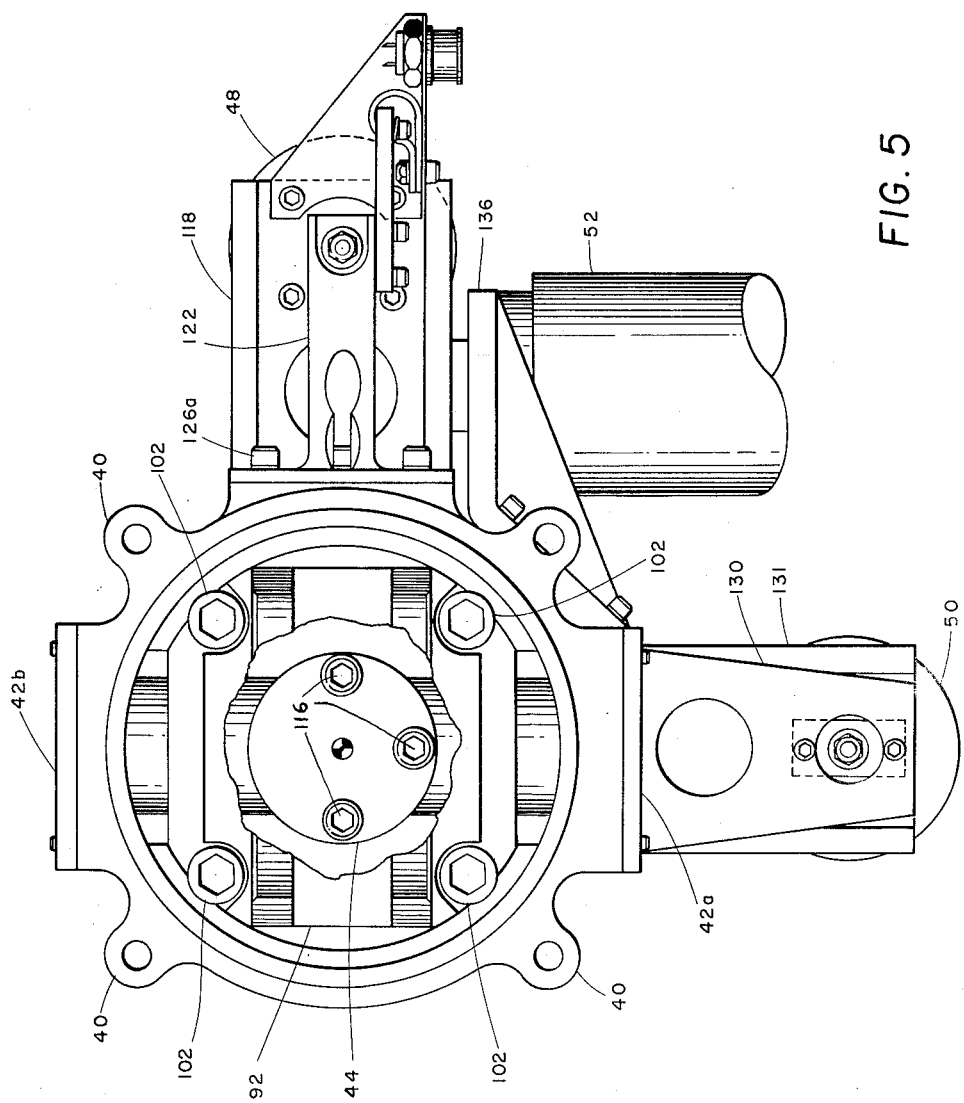

June 18, 1963 D. E. MOORS ET AL 3,094,054
CAMERA STABILIZED MOUNT
Filed Oct. 29, 1957 29 Sheets-Sheet 9
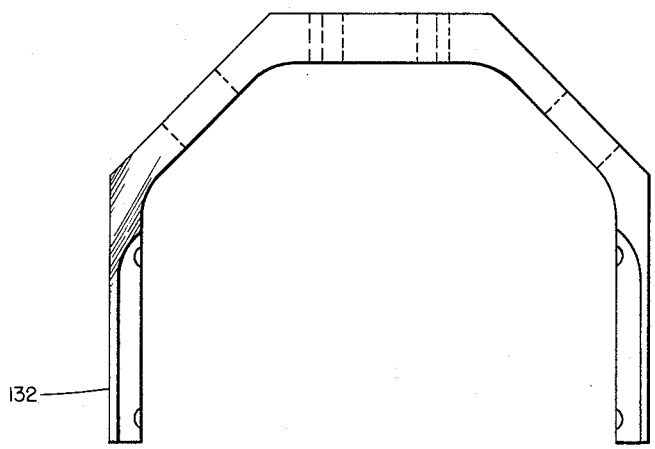
FIG. 6a
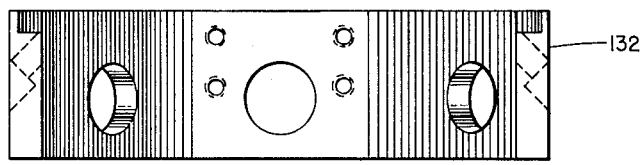
FIG. 6b
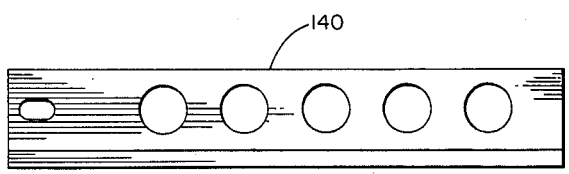
FIG. 6c
Donald E. Moors
Harry L. Sandberg
INVENTORS
BY 
ATTORNEY June 18, 1963    D. E. MOORS ET AL    3,094,054
CAMERA STABILIZED MOUNT Filed Oct. 29, 1957    29 Sheets-Sheet 10

Donald E. Moors
Harry L. Sandberg
INVENTORS

BY *[signature]*

ATTORNEY

June 18, 1963 D. E. MOORS ET AL 3,094,054
CAMERA STABILIZED MOUNT
Filed Oct. 29, 1957 29 Sheets-Sheet 12

Donald E. Moors
Harry L. Sandberg
INVENTORS

BY *[signature]*

ATTORNEY

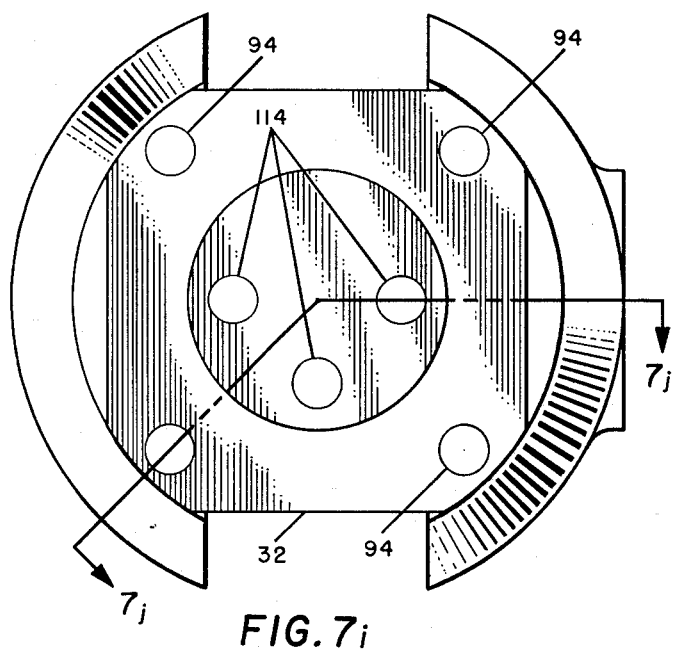
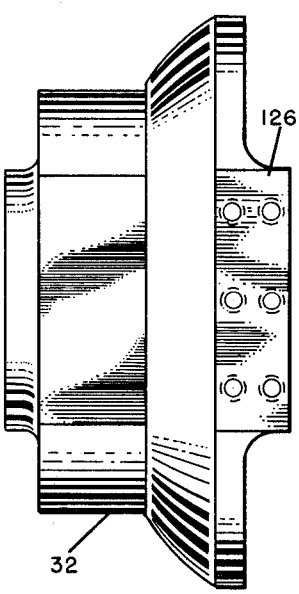
FIG. 7i    FIG. 7h
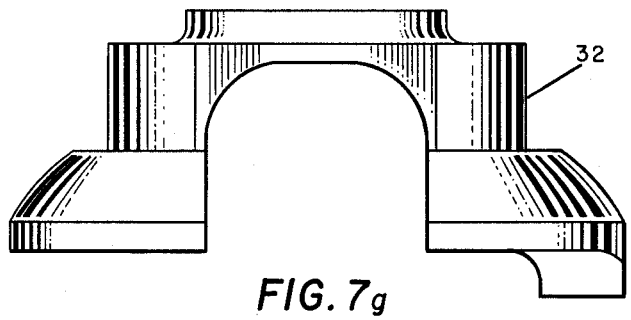
FIG. 7g
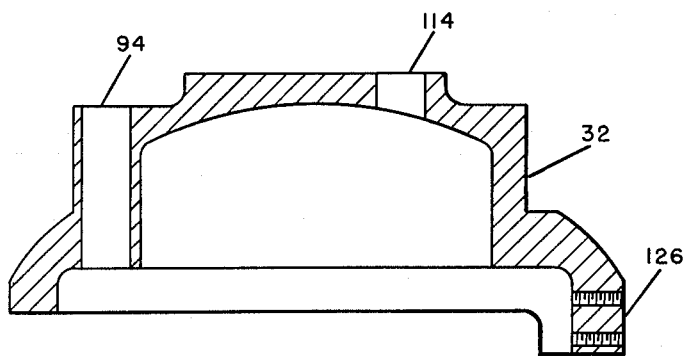
FIG. 7j
Donald E. Moors
Harry L. Sandberg
INVENTORS
BY 
ATTORNEY June 18, 1963 D. E. MOORS ET AL 3,094,054
CAMERA STABILIZED MOUNT
Filed Oct. 29, 1957 29 Sheets-Sheet 14
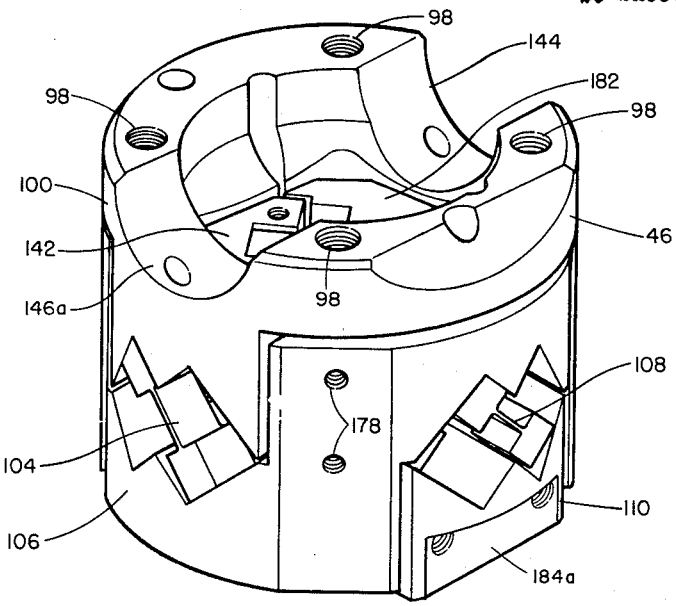
FIG. 8
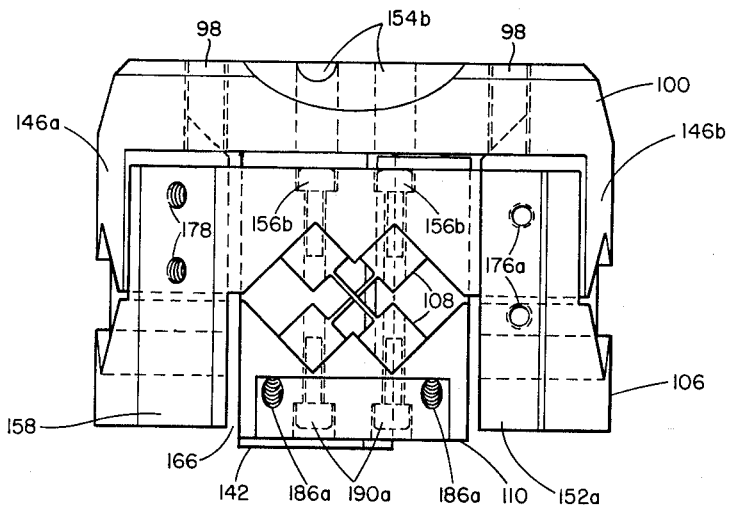
FIG. 9
Donald E. Moors
Harry L. Sandberg
INVENTORS
BY 
ATTORNEY June 18, 1963 D. E. MOORS ET AL 3,094,054
CAMERA STABILIZED MOUNT
Filed Oct. 29, 1957 29 Sheets-Sheet 15
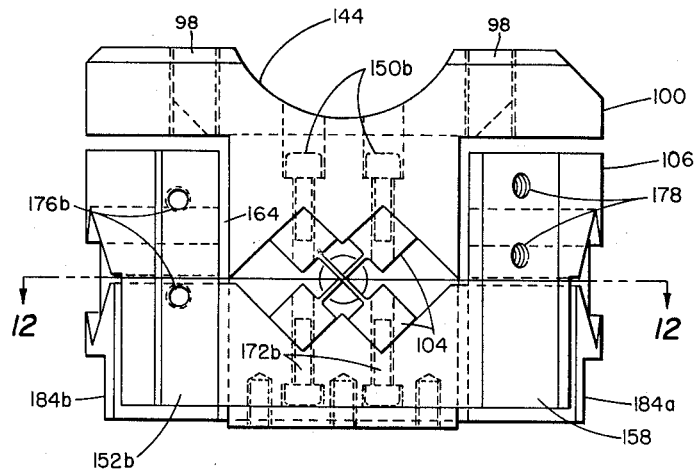
FIG. 11
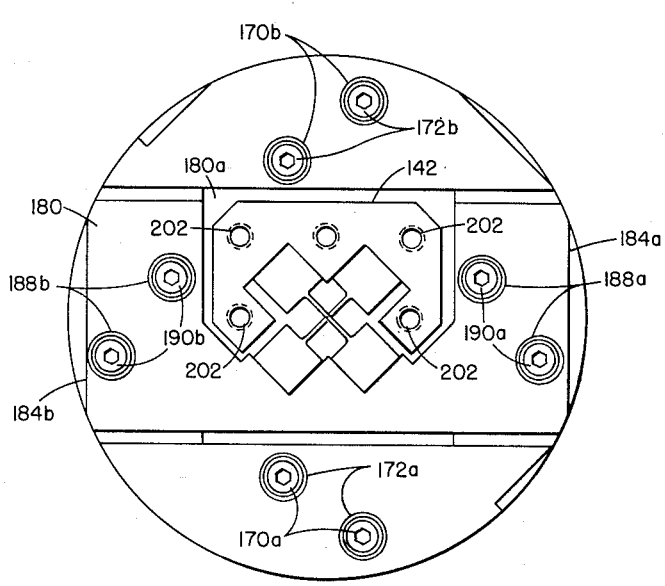
FIG. 10
Donald E. Moors
Harry L. Sandberg
INVENTORS
ATTORNEY

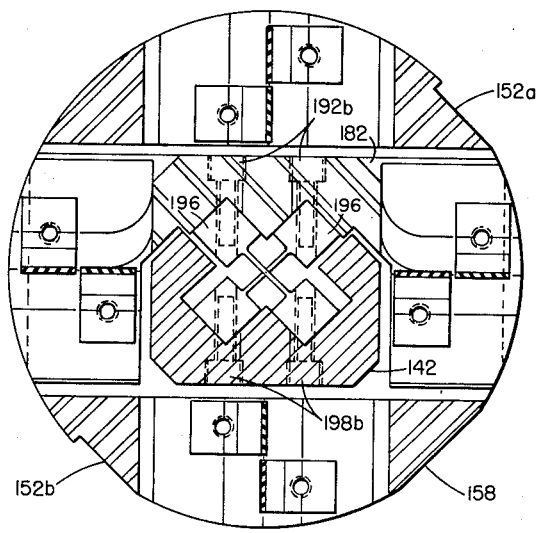
FIG. 12
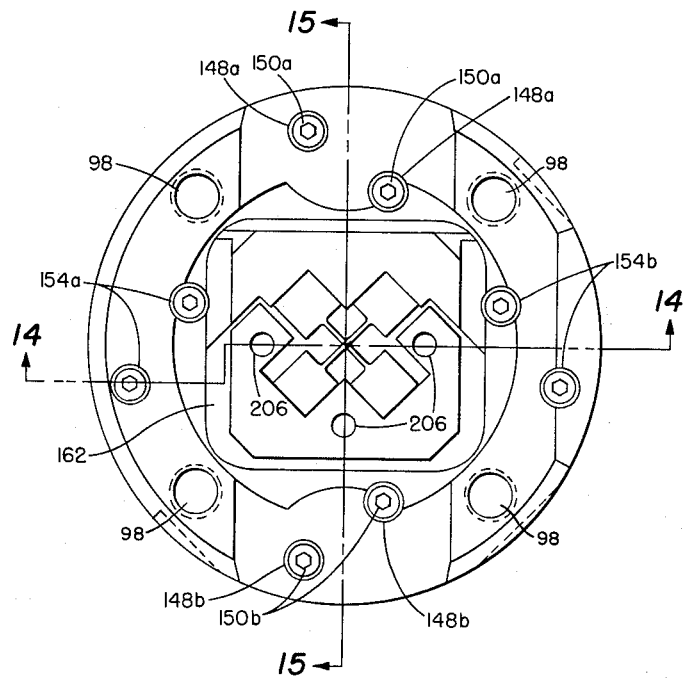
FIG. 13
Donald E. Moors
Harry L. Sandberg
INVENTORS
ATTORNEY

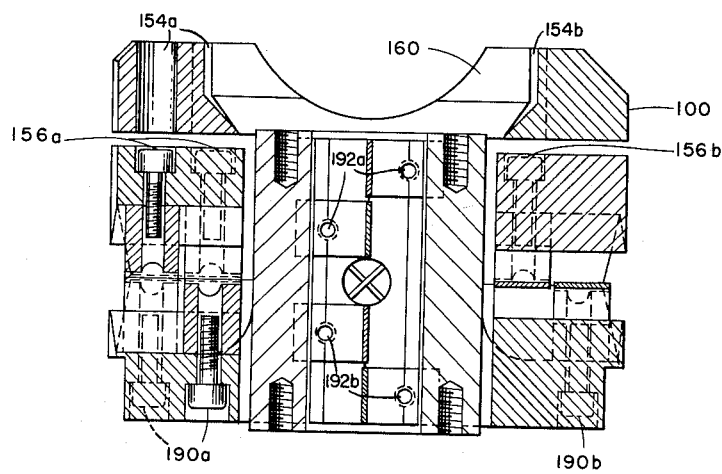
FIG. 14
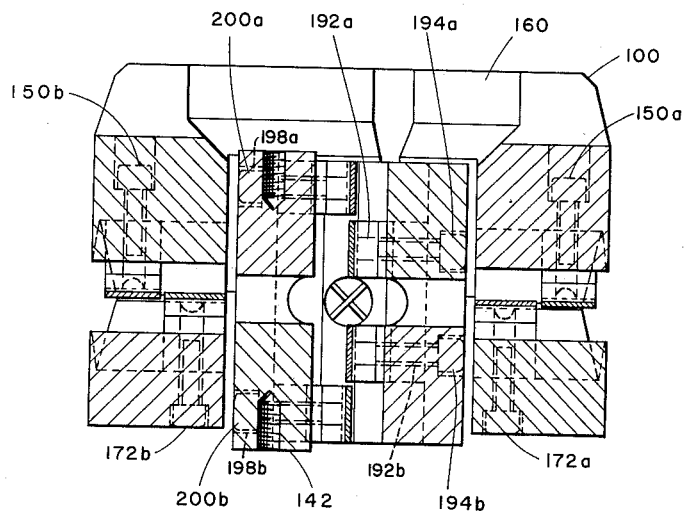
FIG. 15
Donald E. Moors
Harry L. Sandberg
INVENTORS
ATTORNEY June 18, 1963

D. E. MOORS ET AL 3,094,054

CAMERA STABILIZED MOUNT

Filed Oct. 29, 1957

29 Sheets-Sheet 18

Donald E. Moors
Harry L. Sandberg
INVENTORS

BY

ATTORNEY

June 18, 1963      D. E. MOORS ET AL      3,094,054
CAMERA STABILIZED MOUNT
Filed Oct. 29, 1957      29 Sheets-Sheet 19
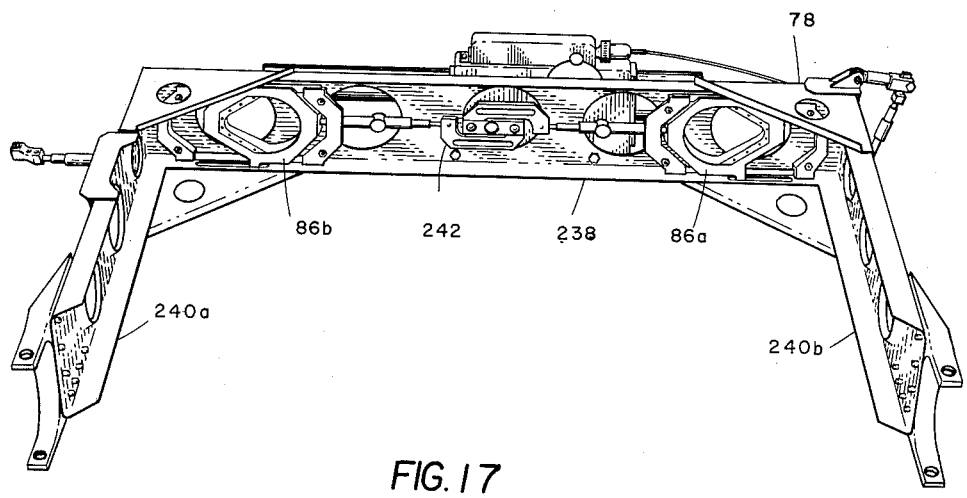
FIG. 17
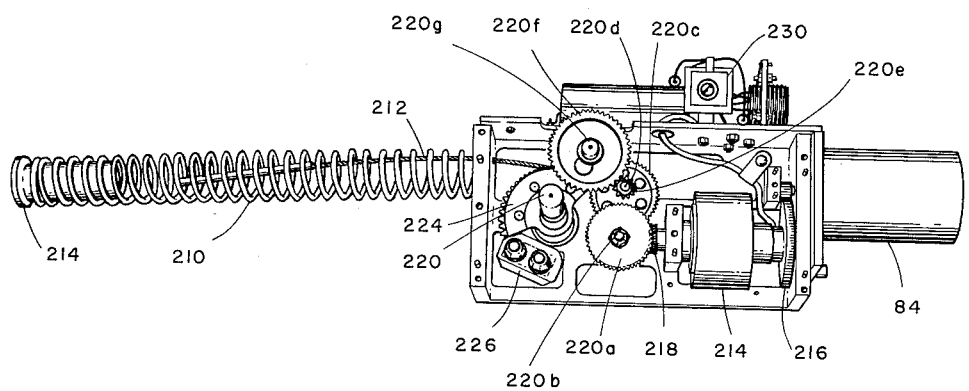
FIG. 18
Donald E. Moors
Harry L. Sandberg
INVENTORS
ATTORNEY

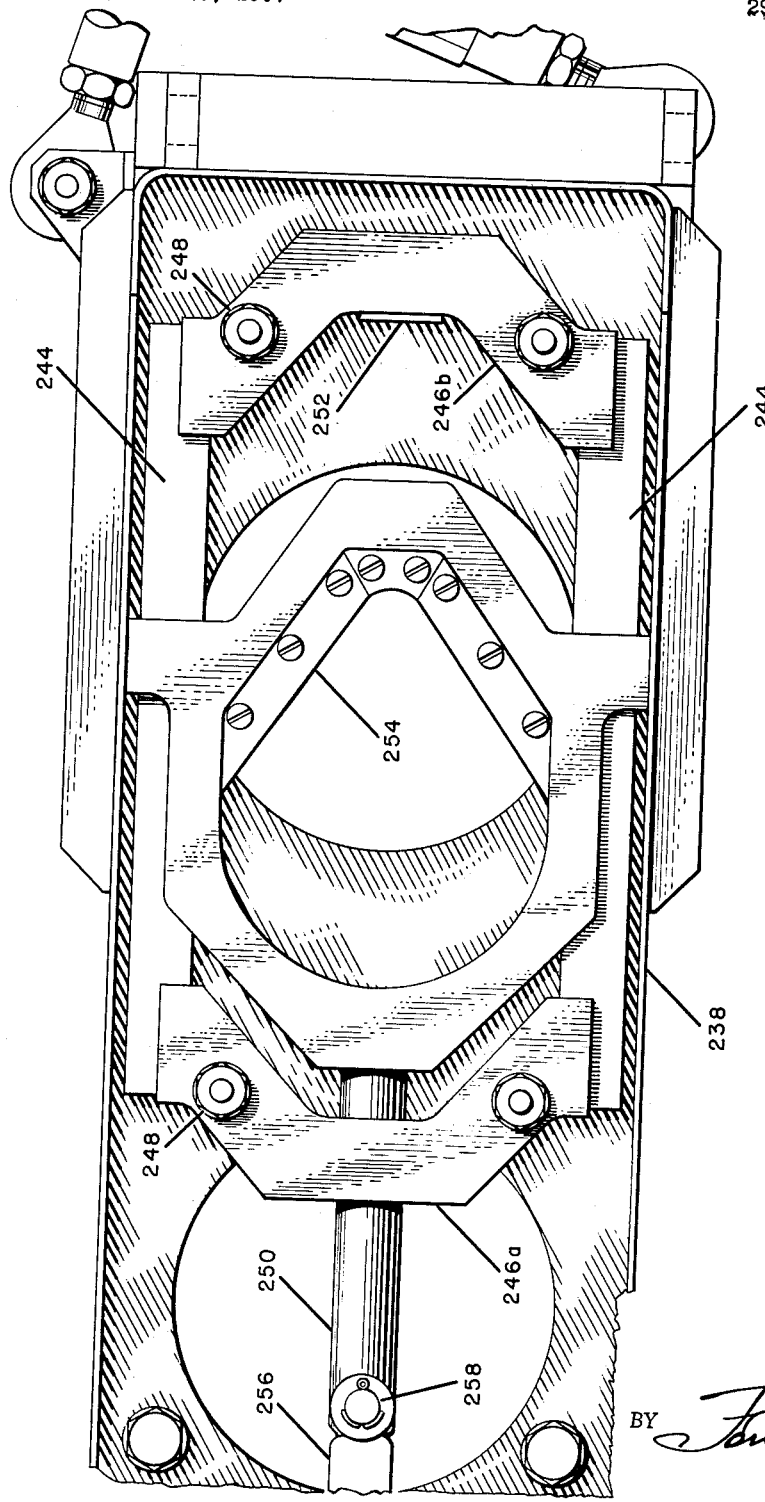
FIG. 17a
Donald E. Moors
Harry L. Sandberg
INVENTORS
BY 
ATTORNEY

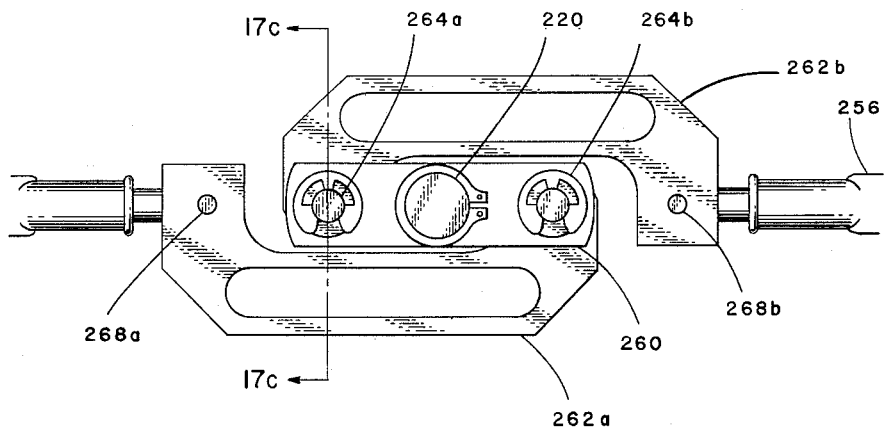
FIG. 17b
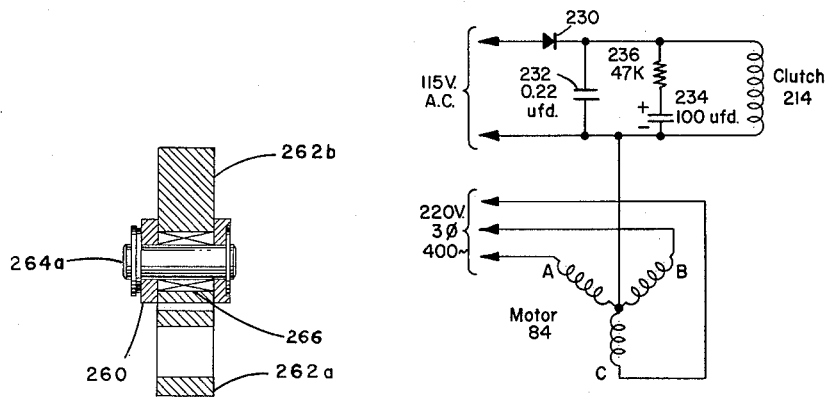
FIG. 17c
FIG. 19

June 18, 1963 D. E. MOORS ET AL 3,094,054
CAMERA STABILIZED MOUNT
Filed Oct. 29, 1957 29 Sheets-Sheet 22

Donald E. Moors
Harry L. Sandberg
INVENTORS

ATTORNEY

June 18, 1963 D. E. MOORS ET AL 3,094,054
CAMERA STABILIZED MOUNT
Filed Oct. 29, 1957 29 Sheets-Sheet 23
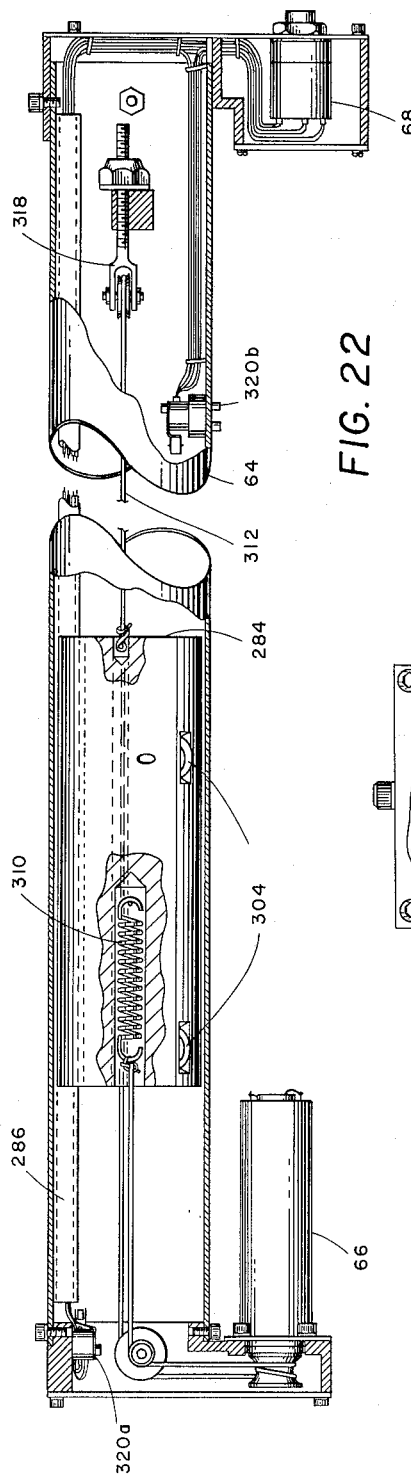
FIG. 22
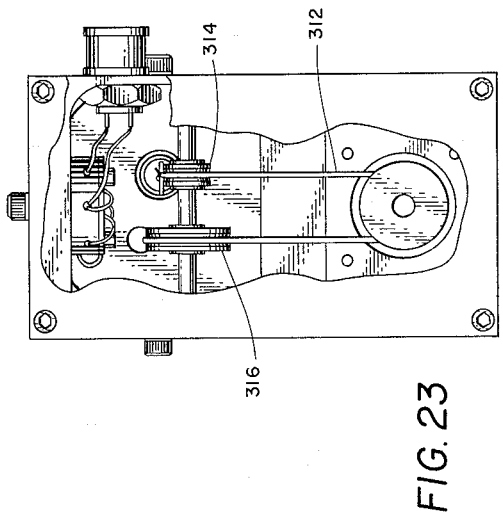
FIG. 23a
FIG. 23
Donald E. Moors
Harry L. Sandberg
INVENTORS
ATTORNEY Donald E. Moors
Harry L. Sandberg
INVENTORS BY [signature]

ATTORNEY

June 18, 1963     D. E. MOORS ET AL     3,094,054
CAMERA STABILIZED MOUNT

Filed Oct. 29, 1957     29 Sheets-Sheet 28

Donald E. Moors
Harry L. Sandberg
INVENTORS

ATTORNEY

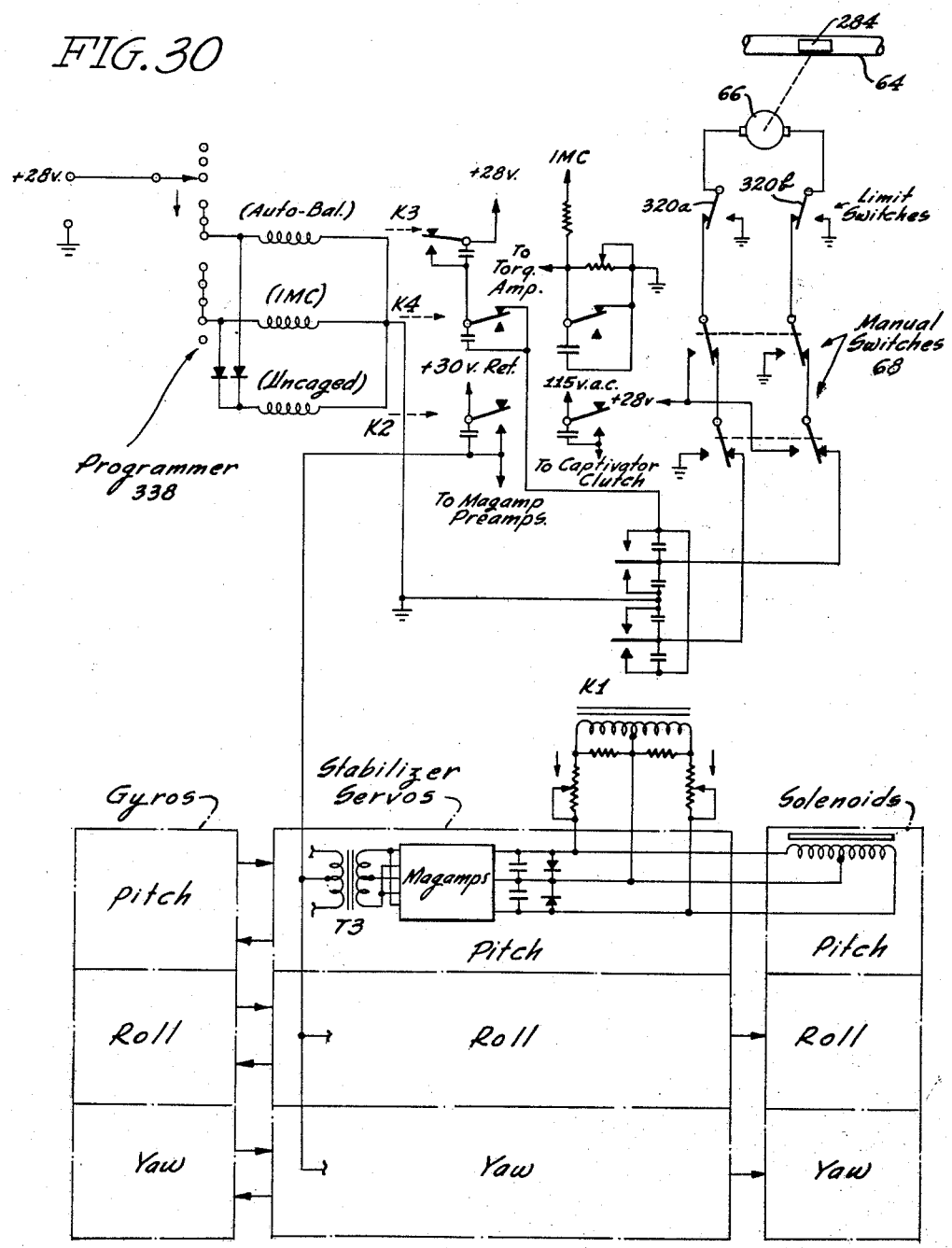

United States Patent Office 3,094,054
Patented June 18, 1963

3,094,054
CAMERA STABILIZED MOUNT
Donald E. Moors, Pasadena, and Harry L. Sandberg, Alhambra, Calif., assignors to Hycon Mfg. Company, Pasadena, Calif., a corporation of Delaware
Filed Oct. 29, 1957, Ser. No. 693,114
5 Claims. (Cl. 95—12.5)

Our invention relates generally to stabilized platforms and more particularly to a stabilized mount for cameras.

When a camera is mounted and operated in a moving vehicle, the camera is normally subjected to all of the motions experienced by the vehicle. A photograph of a stationary object taken by the camera would reflect all of these motions in the picture. The resultant effect, of course, would be blurring of the picture due to relative motion between the camera and the stationary object or scene being photographed. Aerial cameras mounted in aircraft, for example, are often employed to photograph the terrain over which the aircraft flies. For each particular picture, the film in the camera is usually moved in the direction of flight at a rate which minimizes image motion on the film due to forward motion of the aircraft. This is conventional image motion compensation. However, blurring of the picture may still occur because of gyrations of the aircraft mounting the camera which introduces other, uncompensated relative motions. Of course, there is always the effect of vibration and other oscillatory motions on the camera.

It is an object of our invention to provide a camera mount for isolatnig the camera from external disturbing angular motions.

Another object of the invention is to provide a camera mount which is especially useful for aerial cameras in isolating the camera from aircraft angular motions.

Image motion compensation (I.M.C.) is far more effective in practice by rotating (swinging) an aerial camera bodily about an axis which eliminates image motion across the film, than by moving the film itself. If the camera mount can be caused to rotate about an axis at a rate which compensates for image motion due to forward velocity of the aircraft, blurring of the picture will be imperceptible.

Another object of our invention is to provide a camera mount which can rotate the camera about an axis at a rate to produce effective image motion compensation.

A further object of the invention is to provide a camera mount in which angular velocity of the mount about any axis can be controlled extremely accurately.

Briefly, the foregoing and other objects are preferably accomplished by providing a three axis, flexure supported gimbal for mounting a camera. Torquer solenoids are attached to the gimbal between gimbal rings and controlling means including rate gyros connected in velocity servos for sensing any angular motion of the mount are included to signal the solenoids to exert torque on the mount so as to oppose the sensed angular movement of the mount. When the mount reaches zero velocity, no signal is generated and none of the solenoids are actuated. The controlling means can also command rates other than zero velocity about an axis to provide image motion compensation. A mechanical cager can lock the camera to airframe structure, for example, when the camera stabilized mount is not in operation.

Figure 2:
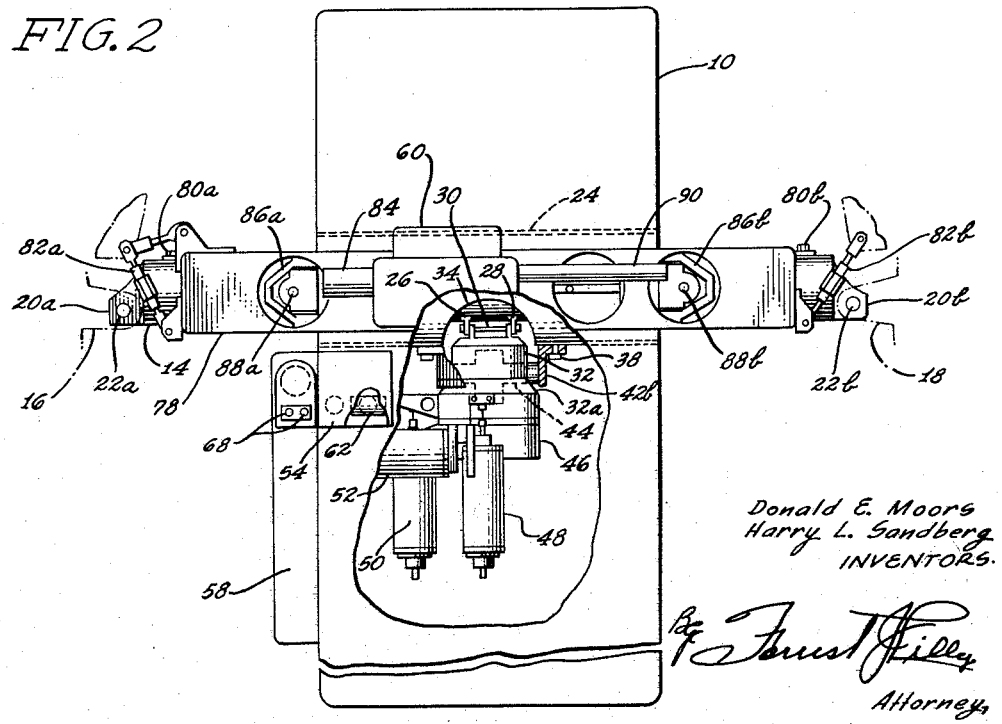
Figure 2A:
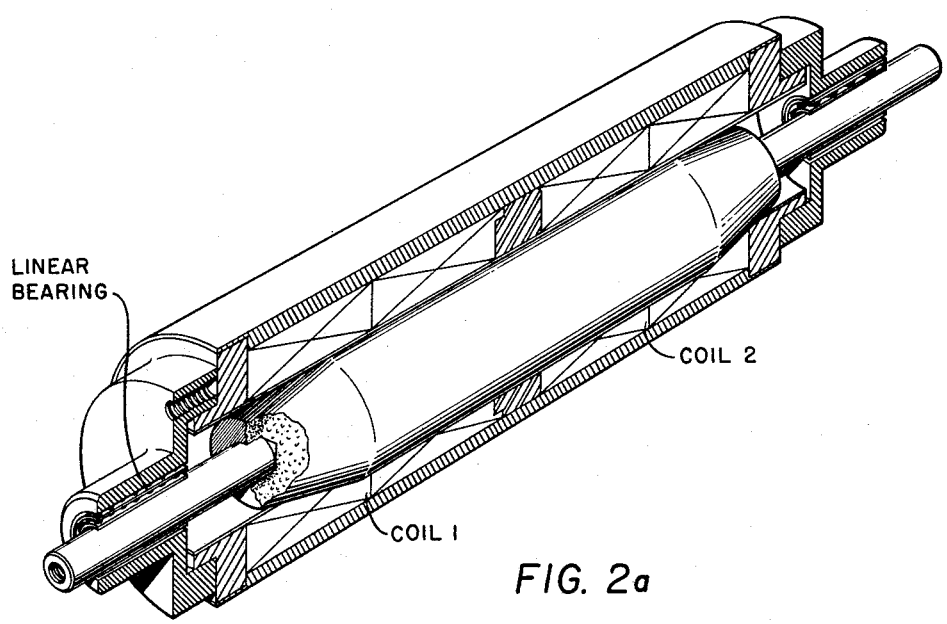
Figure 3:
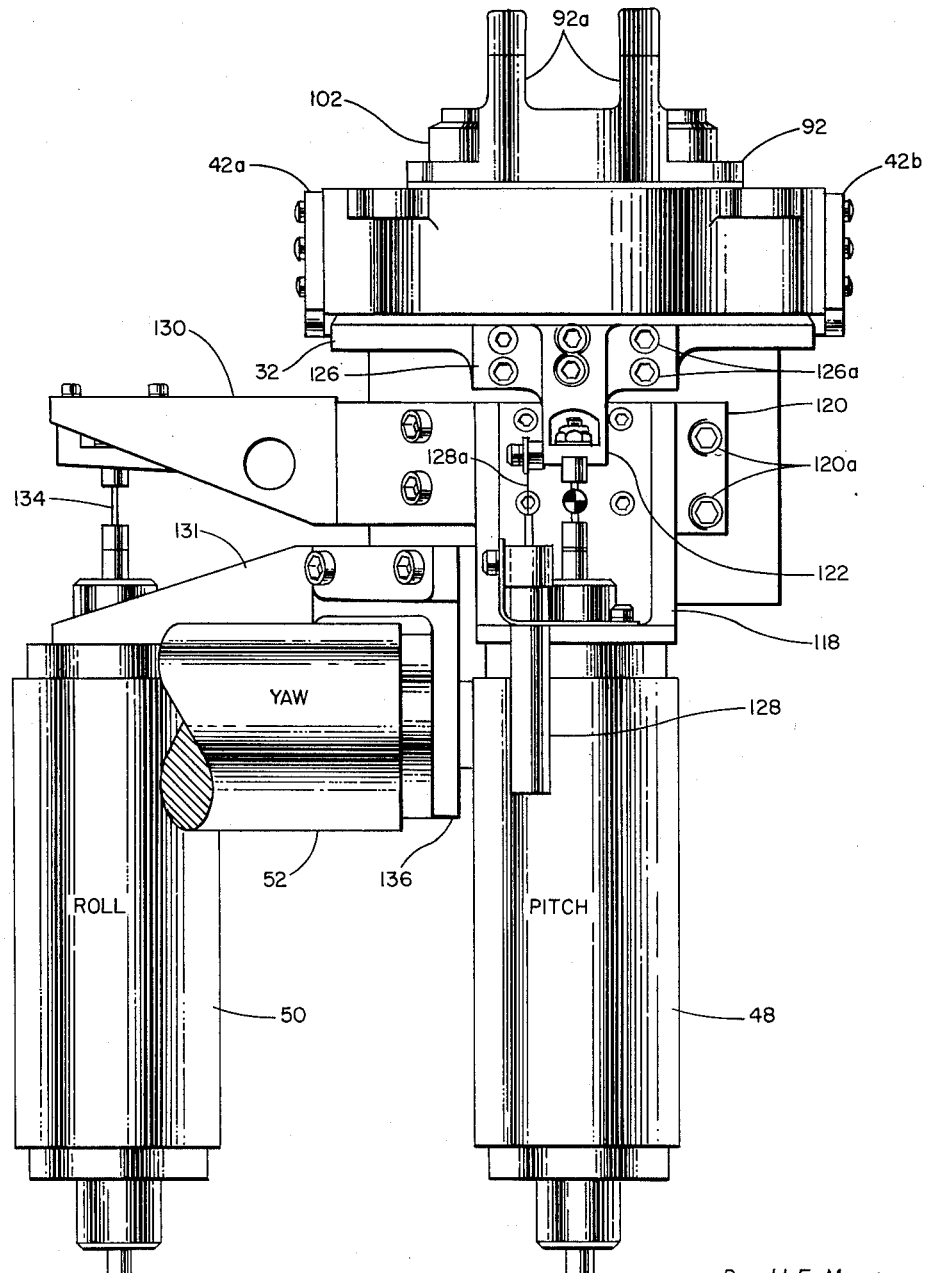
Figure 6:
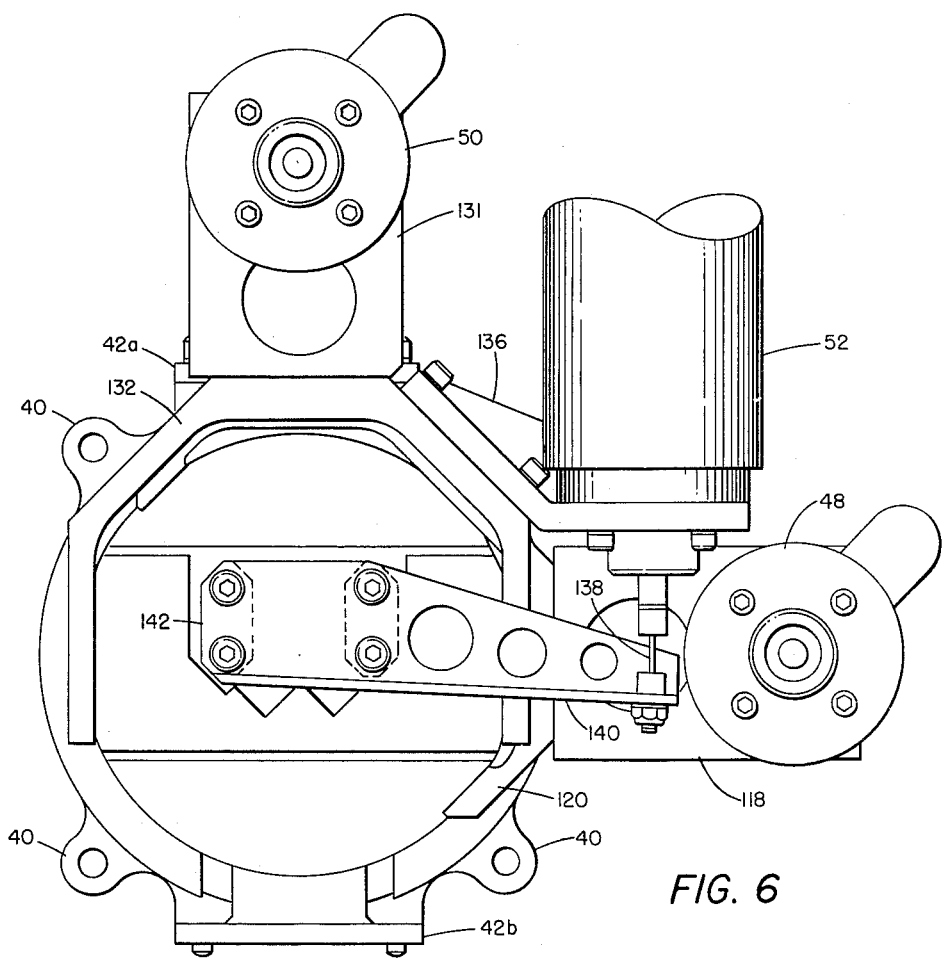
Figure 5A:
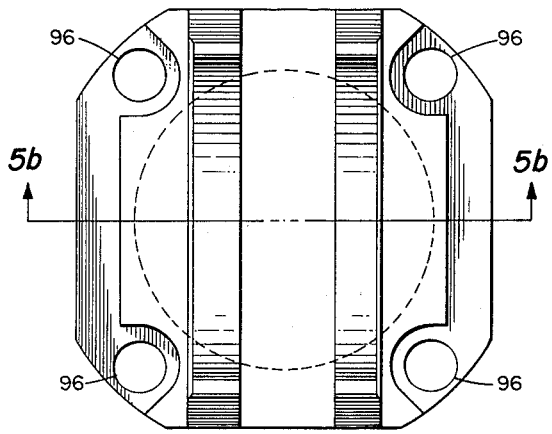
Figure 7:
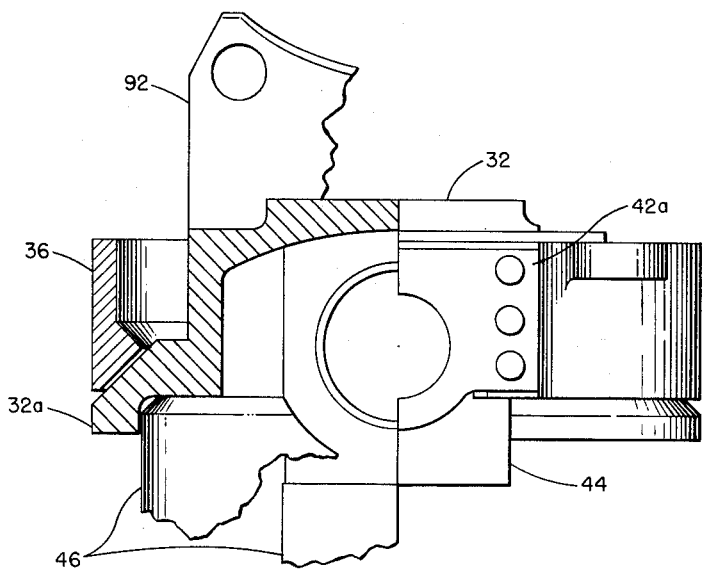
Figure 7A:
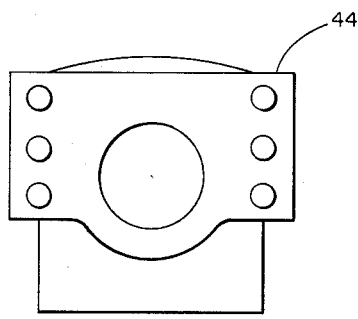
Figure 7B:
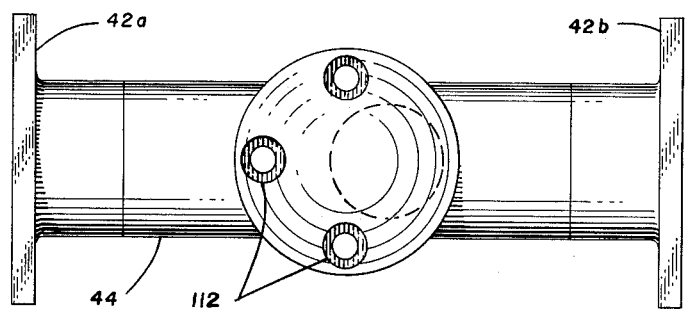
Figure 7C:
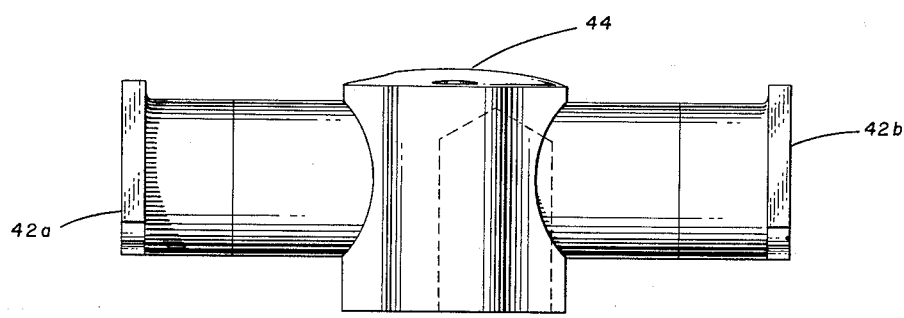
Figure 7D:
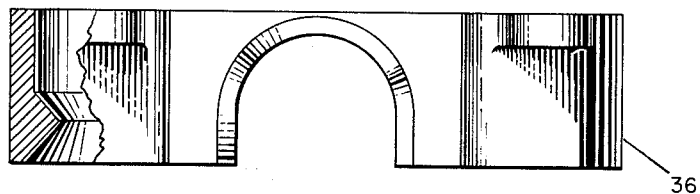
Figure 7E:
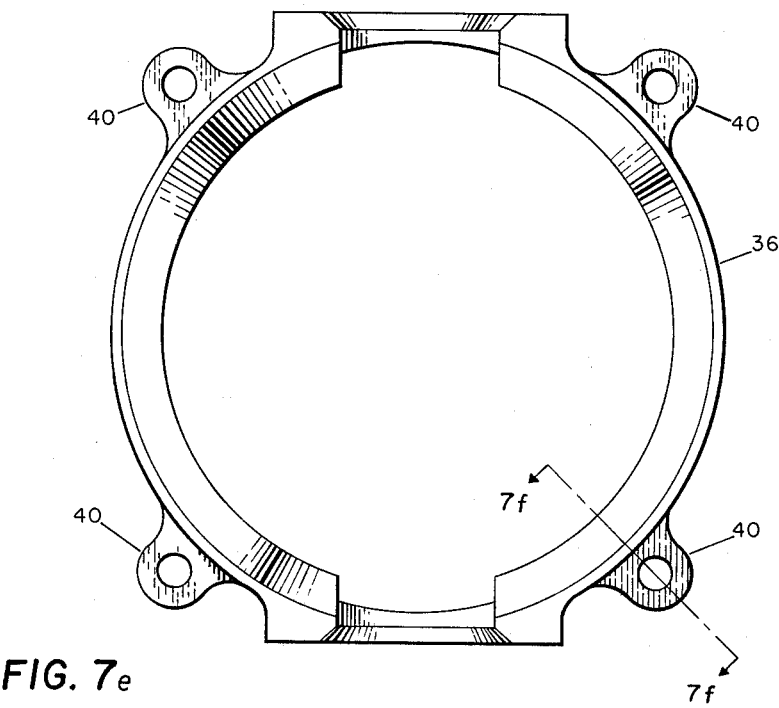
Figure 7F:
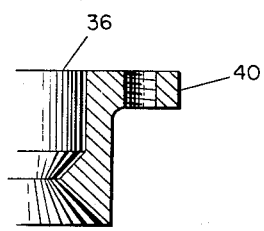
Figure 16:
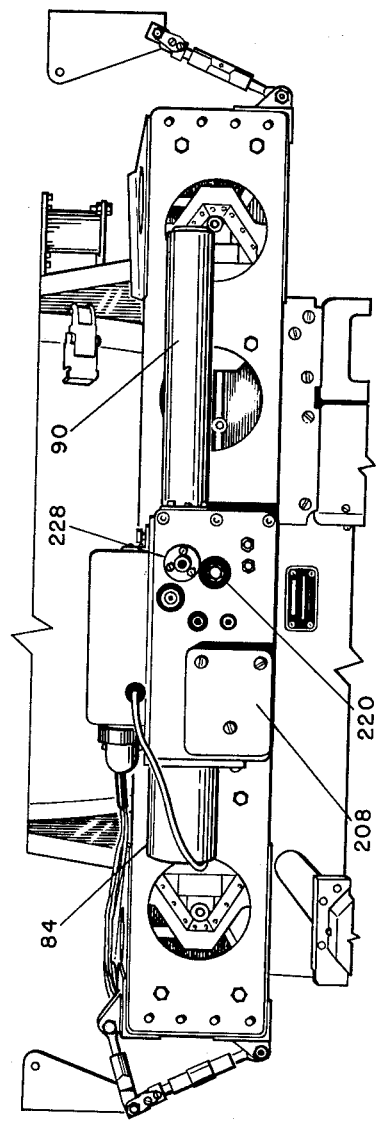
Figures 20A, 20B:
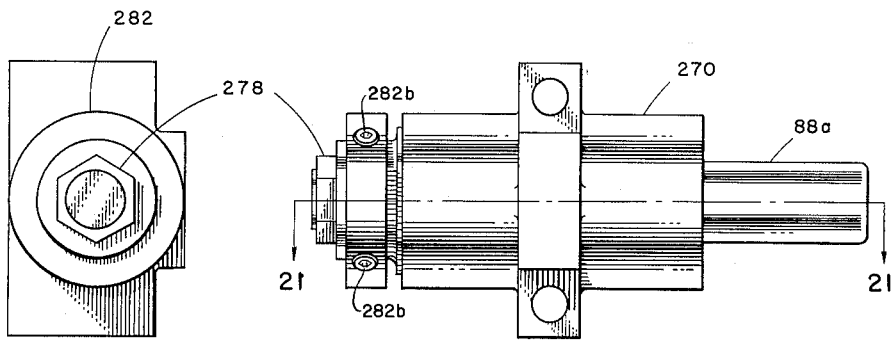
Figure 21:
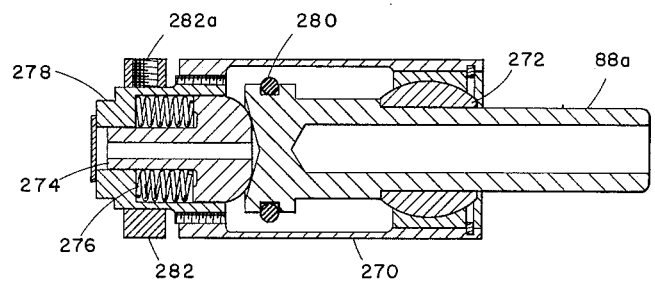
Figure 24:
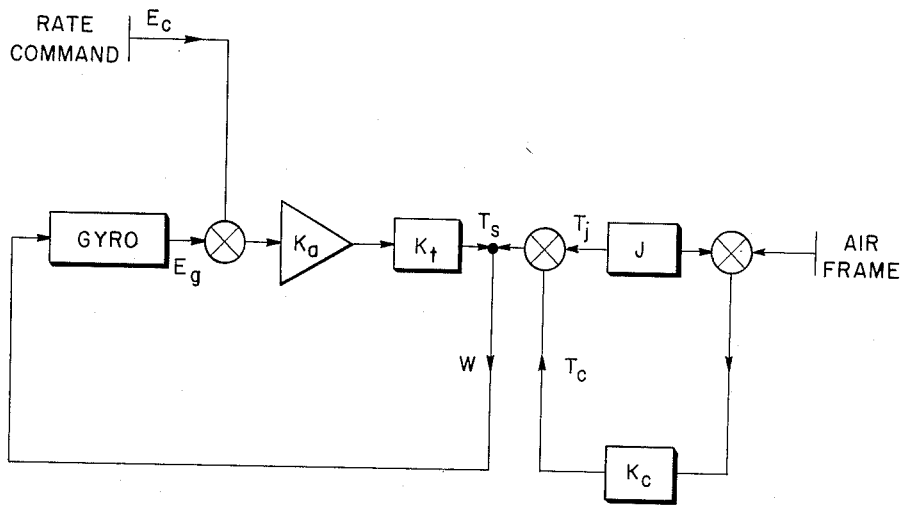
Figure 25:
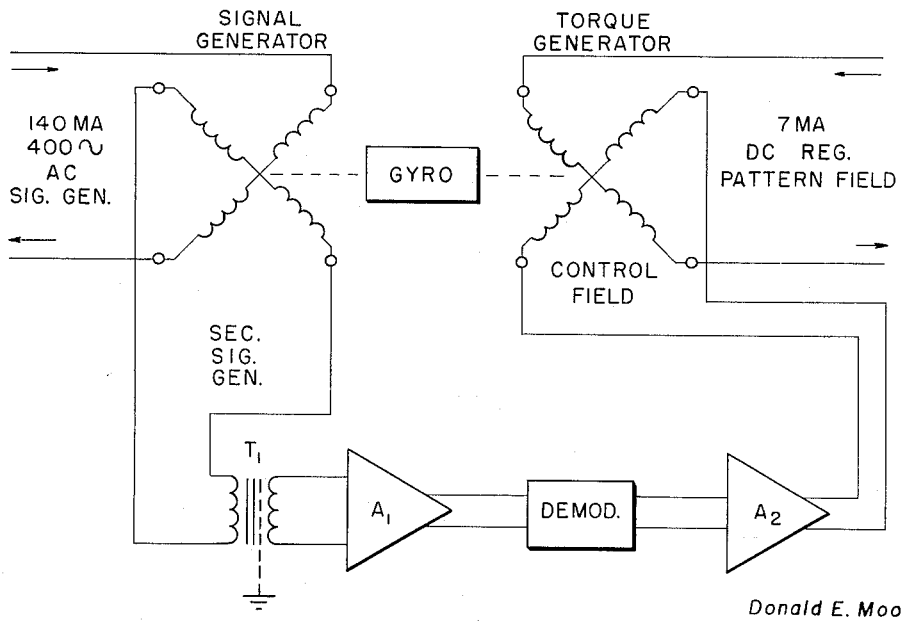
Figure 26:
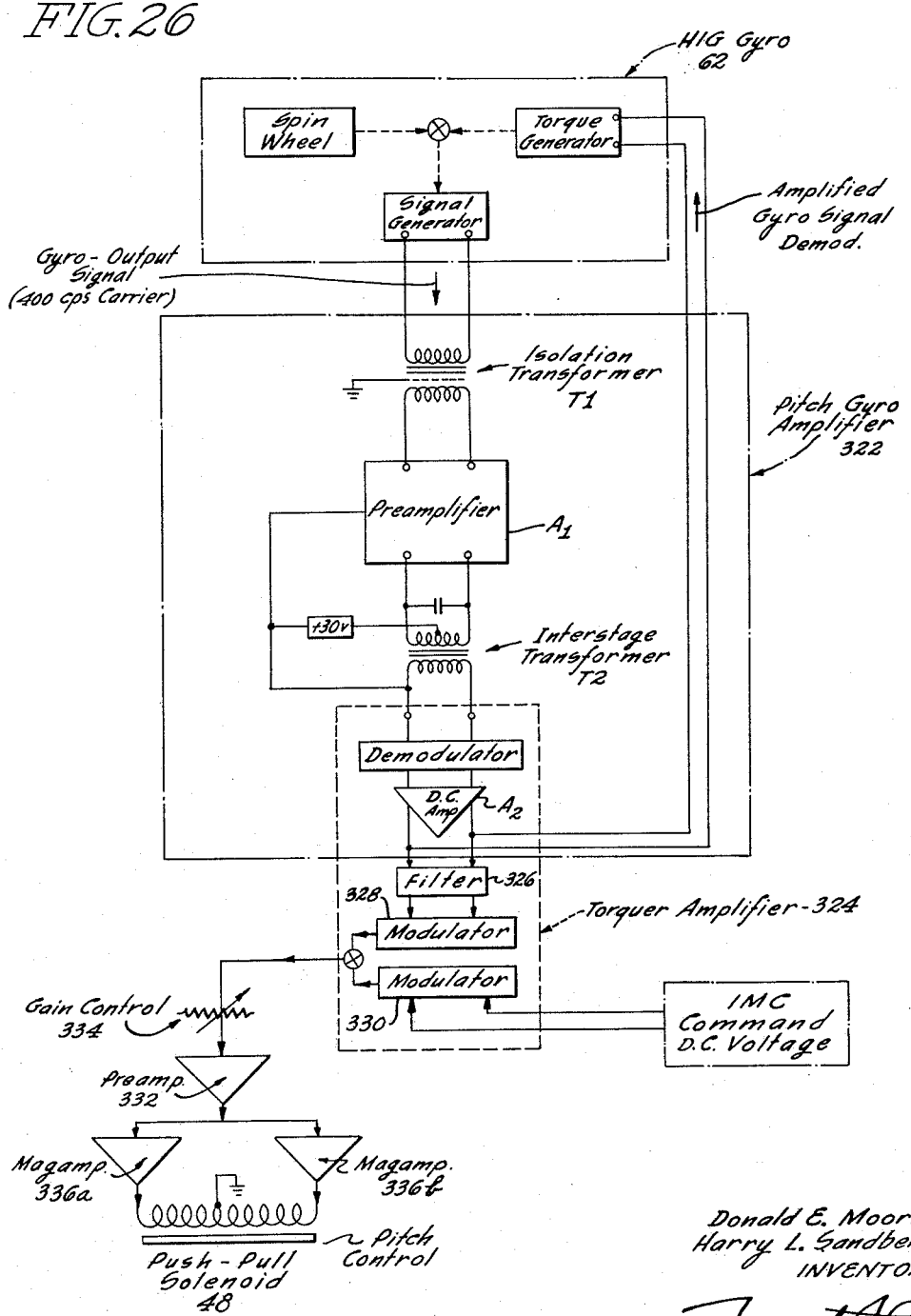
Figure 27:
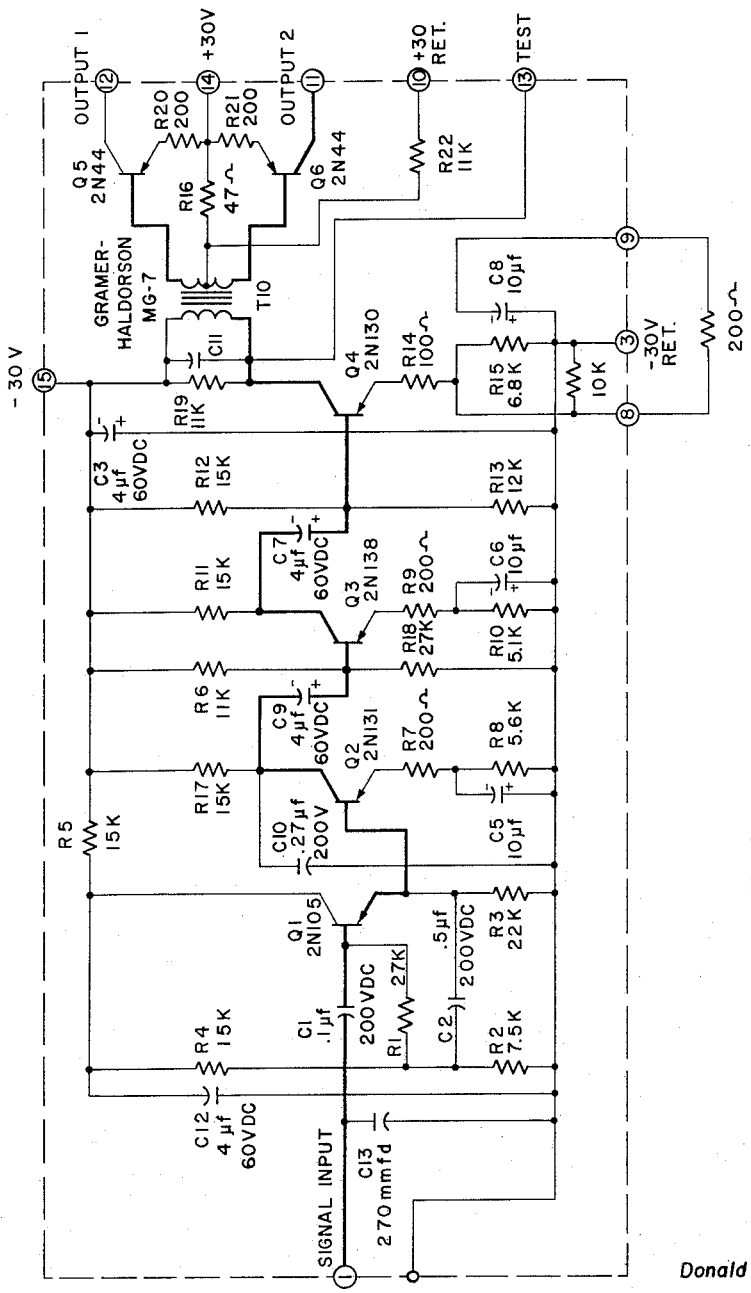
Figure 28:
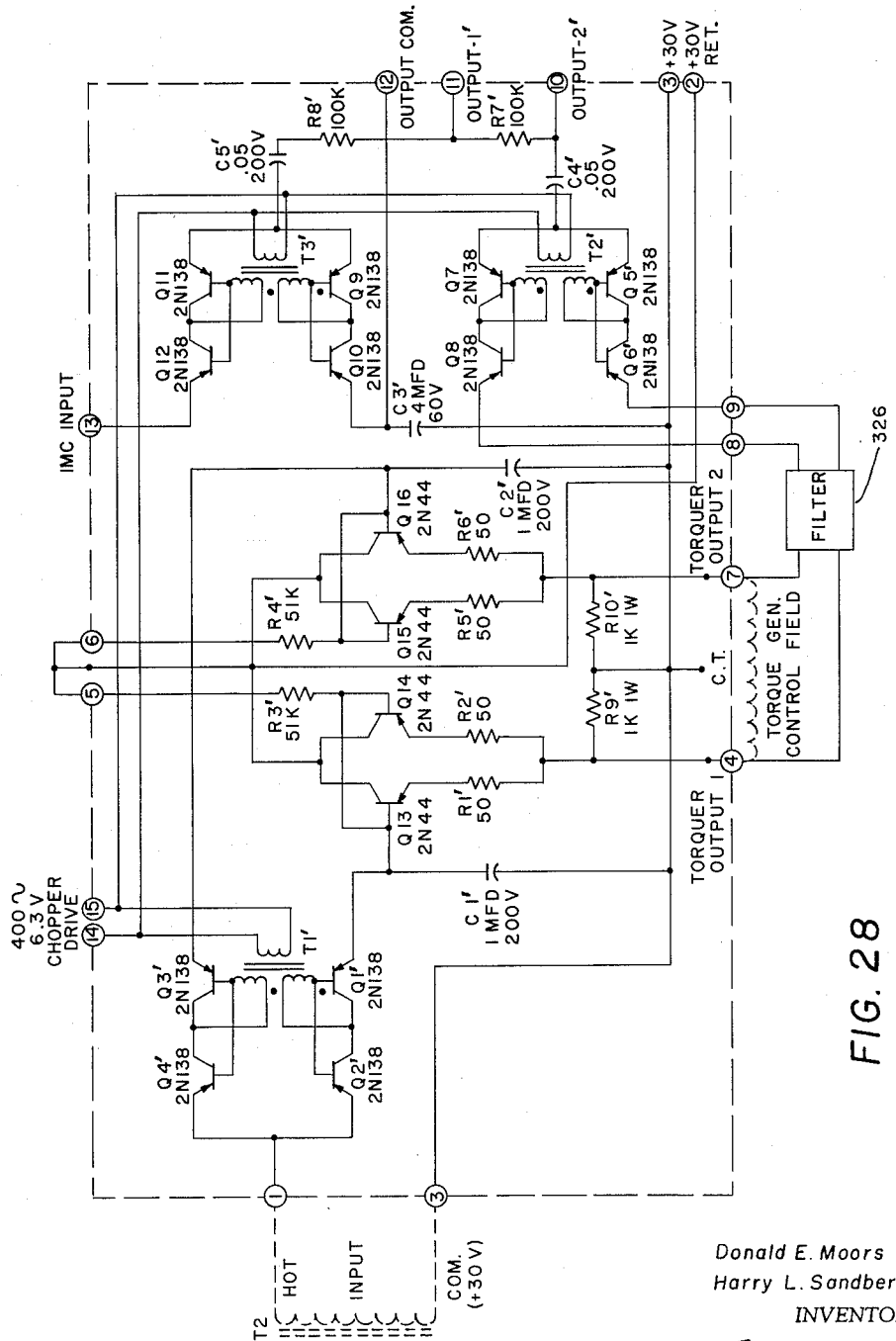
Figure 29:
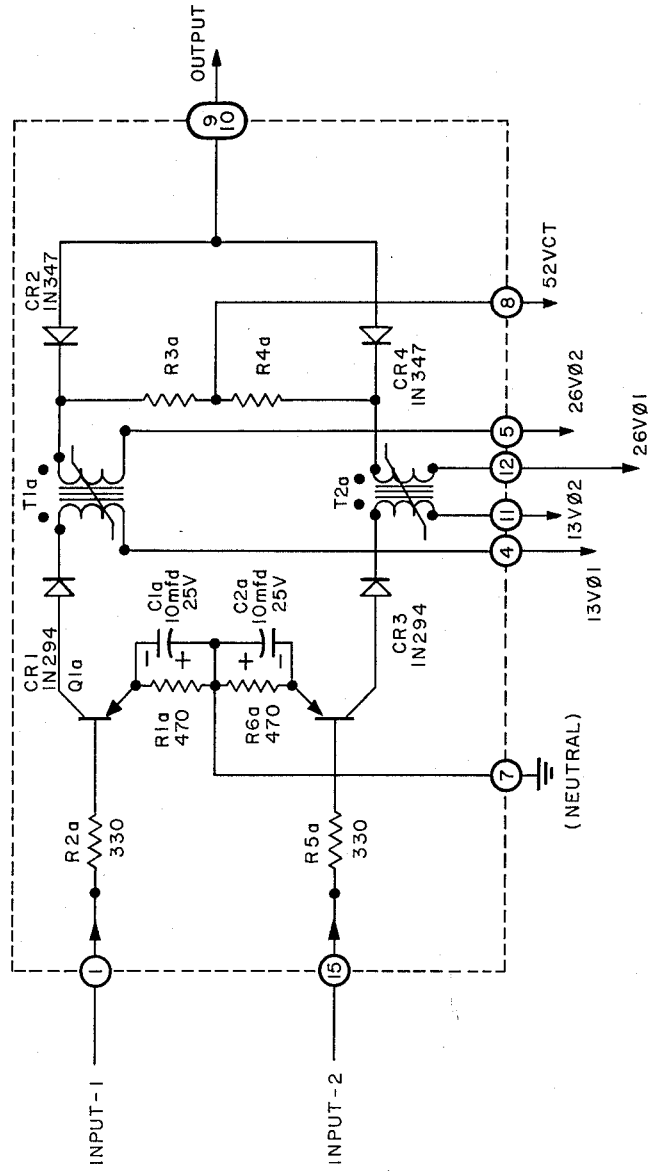

Our invention possesses numerous other objects and features, some of which together with the foregoing, will be set forth in the following detailed description of a preferred embodiment of the invention, and the invention will be more fully understood by reading the description with joint reference to the attached drawings, in which:

FIGURE 1 is a side view of a camera being supported on a stabilized mount of preferred construction;

FIGURE 2 is a rear view of the supported camera of FIGURE 1;
FIGURE 2a is a drawing illustrating a push-pull linear solenoid;
FIGURE 3 is a side view of the camera stabilized mount structure showing torquer solenoids connected to a three axis, flexure supported gimbal;
FIGURES 3a, 3b, 3c and 3d are detail drawings of a bracket which is attached to an upper yoke of the mount;
FIGURE 4 is an end view of the mount;
FIGURES 4a and 4b are detail drawings of the upper yoke;
FIGURE 5 is a top plan view of the mount;
FIGURES 5a and 5b are detail views of an adapter plate;
FIGURE 6 is a bottom view of the mount;
FIGURES 6a and 6b are detail views of a lower yoke;
FIGURE 6c is an elevational view of a bracket arm;
FIGURE 7 is a partial sectional view which illustrates the connection between camera structure to airframe through the flexure gimbal;
FIGURES 7a, 7b and 7c are detail views of a trunnion member which connects a cylindrical ring member supporting the camera to the flexure gimbal;
FIGURES 7d, 7e and 7f are detail views of the cylindrical ring member;
FIGURES 7g, 7h, 7i and 7j are detail views of a ball joint structure;
FIGURE 8 is a perspective of a three axis, flexure supported gimbal;
FIGURE 9 is an end elevational view of the flexure gimbal;
FIGURE 10 is a bottom view of the flexure gimbal;
FIGURE 11 is a side elevational view of the flexure gimbal;
FIGURE 12 is a sectional view taken along the line 12—12 in FIGURE 11;
FIGURE 13 is a top plan view of the flexure gimbal;
FIGURES 14 and 15 are sectional views taken along the lines 14—14 and 15—15, respectively, in FIGURE 13;
FIGURE 16 is a front view of a captivator, looking at the back of the camera;
FIGURE 17 is a perspective showing the U-frame structure of the captivator;
FIGURES 17a, 17b and 17c are fragmentary, enlarged views illustrating detail captivator structure;
FIGURE 18 is a back view of the captivator actuator which drives a pair of captivator sliders to cage and uncage the camera;
FIGURE 19 is a circuit diagram of the captivator drive motor and clutch;
FIGURES 20a, 20b and 21 are detail drawings of a shock absorber pin;
FIGURES 22 and 23 are drawings illustrating an autobalance assembly for the camera stabilized mount;
FIGURE 23a is a perspective illustrating the autobalance weight;
FIGURE 24 is a functional servo block diagram for single axis stabilization;
FIGURE 25 is a block diagram illustrating a gyro loop used in the camera stabilized mount;
FIGURE 26 is a block diagram of the pitch axis servo channel;
FIGURE 27 is a detailed wiring diagram of a preamplifier used in a servo channel;
FIGURE 28 is a detailed wiring diagram of a torquer amplifier used in a servo channel;
FIGURE 29 is a detailed wiring diagram of a half section of a full wave magnetic amplifier; and
FIGURE 30 is a wiring diagram generally illustrating the control circuitry for the camera stabilized mount.

FIGURES 1 and 2 are simplified drawings which illustrate a general arrangement in which a camera 10 can be mounted on a preferred embodiment of the invention. The camera 10 is shown only in outline form for clarity of illustration and the camera 10 in this instance is depicted as being mounted in an aircraft, for example. FIGURE 1 is a side view of the camera mounted so that the forward end of the aircraft is to the left, as indicated by arrow 12 and the view shown in FIGURE 2 is that looking forward from behind the camera 10. The camera 10 is a conventional aerial camera for taking pictures of the terrain over which the aircraft flies. The optical elements of the camera 10 are suitably arranged to look downward at the ground which is towards the bottom of the sheet in the illustrations of FIGURES 1 and 2. The camera 10 is conventional but is structurally adapted to fit on the stabilized mount.

A tube 14 is mounted transversely in the aircraft between a left wall flange 16 and a right wall flange 18. Both ends of the tube 14 are each terminated in a pair of parallel ears 20a and 20b, between which the flanges 16 and 18 extend and are each secured thereto by bolts 22a and 22b (FIGURE 2). Thus, aircraft structure is effectively extended from one wall to the other in the form of a tube 14. This tube 14 passes transversely through the body of the camera 10 through a tunnel formed by a larger tube 24, concentric with tube 14 and which is integrally a part of the camera 10. The camera 10 literally surrounds the tube 14, in this instance.

The inner tube 14 has two dependent flanges 26 and 28 (FIGURE 2) which are parallel to each other and lie in planes that intersect the wall of the inner tube 14 at right angles. Each flange 26 or 28 is equidistantly spaced on opposite sides near the middle of the length of tube 14, and have two holes in each through which two bolts 30 can be passed parallel to the axis of tube 14. These bolts 30 attach and secure a "ball joint" structure 32 having flaring lower sides 32a to the inner tube 14 which is effectively aircraft structure. The larger, outer tube 24 has a lower central cutout 34 which permits the ball joint structure 32 to reach the inner tube 14, and the outer tube 24 is attached and secured to a cylindrical ring member 36 by four bolts 38 which pass through holes in tab flanges 40 of the cylindrical member 36. The cylindrical member 36 has two diametrically opposed end plates 42a and 42b which are affixed to the cylindrical member 36, and each end plate has a circular cut therein which mounts trunnions of a cross shaped trunnion member 44. The ends of the trunnions are welded to the end plates at the circular cuts. This trunnion member 44 is connected through a three axis, flexure supported gimbal 46 to the ball joint structure 32. Thus, the camera 10 is supported by way of outer tube 24, cylindrical member 36, trunnion member 44, flexure supported gimbal 46, ball joint structure 32, and finally inner tube 14, which is fixed aircraft structure.

The camera 10 is supported on flexures; however, a safety ball joint type support is provided by the lower edge of the cylindrical member 36 and the conically sloping side of ball joint structure 32. In the event of flexure failure, the camera 10 can be effectively supported by the lower edge of cylindrical member 36 resting against the lower flaring conical sides 32a of ball joint structure 32. In normal operation, these two surfaces have a nominal clearance of 0.020 inch, for example, and there is no contact between adjacent surfaces, and outer tube 24 is held concentric with the inner tube 14.

A three axis, flexure supported gimbal is provided on which a camera can be mounted and be oriented in any direction. The camera 10 can be moved about any of three axes by torquer solenoids which are mounted between gimbal rings so that each solenoid torques only about the axis on which it is mounted. A pitch solenoid 48, roll solenoid 50, and yaw solenoid 52 are mounted between gimbal rings generally as shown in FIGURES 1 and 2. The torquer solenoids are preferably two coil, linear solenoids that can either push or pull, depending upon which coil is energized. It is in effect two solenoids set back to back, and the core of a solenoid is tapered to give a nearly linear displacement characteristic. Ball bushings for linear motion are used to support the core in order to minimize friction. Tractive force is nearly linear over a working stroke of ±¼ inch from center position. FIGURE 2a shows the construction of a push-pull solenoid. A satisfactory and preferred two coil, push-pull leakage flux solenoid, type PPL–200–45, is commercially available and manufactured by American Solenoid Company, P.O. Box 65885, Los Angeles 65, California.

Torquing moments which can be produced by the solenoids in the mount, for example, are: roll, 1 lb.-ft.; yaw, 1 lb.-ft.; and pitch, 1½ lb.-ft. This mount will isolate the camera from disturbing airframe rates up to 20 milliradians per second. Normal operating angular velocities about the three axes are: roll, 0±0.3 milliradian per second, yaw, 0±0.3 milliradian per second, and pitch, 8 to 16±0.3 milliradians per second. These figures apply to a stabilized mount including camera having a weight of approximately 550 lbs., approximately 80 pounds of which are stabilizer components, and moment of inertia about the three axes as follows: roll, 10 slug ft.$^2$; yaw, 10 slug ft.$^2$; and pitch, 20 slug ft.$^2$.

The point of suspension of camera mass by the flexure gimbal is located, for example, at 0.010 inch above the center of gravity. The camera mass as denoted here includes other major components of the camera stabilized mount such as a gyro assembly 54, autobalance assembly 56, and servo amplifier assembly 58 together with power supply. A captivator 60 or cager device is a major component which does not add to the camera mass since it is supported purely by aircraft structure. The gyro assembly 54 is a conventional assembly including three single axis rate gyros 62 which are mounted mutually perpendicular to each other and sense angular motion respectively about the three axes of the camera stabilized mount. Reeves hermetic integrating gyros, type HIG–5, for example, can be satisfactorily used in this application. A temperature controller for the gyros, gyro spin motor power supply and gyro signal generator power supply are included in the gyro assembly 54 and are also all conventional items.

An autobalance assembly 56 (FIGURE 1) is used to compensate for change in the static balance of the camera caused by transport of film from the camera supply reel onto the takeup reel. The autobalance assembly 56 includes a long tube 64 located along the length of the camera on one side, containing a movable weight that is actuated by a system of pulleys and a D.C. motor 66. Commands to shift the weight are derived from a stabilized mount servo circuit where error signals due to static unbalance are detected. The autobalance drive motor 66 is, for example, a 28 volt D.C. permanent magnet type motor that is reversible by switching polarity of the brushes. Limit switches are conventionally provided at both ends of the tube 64 to cut off the drive motor 66 if a condition exists where the weight is driven to an end of the tube 64. Manual operation can be accomplished by two auxiliary switches 68 located at one end of the tube 64.

Static unbalance of the camera causes it to drift in the direction of unbalance. Thus, a steady state error signal is present whenever the camera becomes unbalanced. This stabilization error is detected by the gyro sensors 62 and amplified by a servo amplifier. The amplified signal actuates a control relay which energizes the autobalance drive motor 66 to move a slug so as to compensate for unbalance of the camera. The weight of the slug is, for example, 3.75 lbs. and the compensation rate can be 0.67 in.-lb./sec. Compensation must take place only during the steady state portions of the stabilizing cycle; as transient rates caused by motion of the airframe at the time of uncaging, unequal reaction of captivator pins, and switching to image motion compensation, must not be used since they are not caused by the static unbalance of the camera.

The camera stabilized mount servo generally comprises three velocity servo channels; pitch, roll and yaw. Each channel is substantially independent electrically of the other two and each channel includes a rate gyro, gyro pre-amplifier, torquer amplifier, power amplifier and push-pull solenoid. These amplifiers are located mainly in container 70, and various electrical interconnections are made in junction box 72 (FIGURE 1). Two smaller containers 74 and 76 respectively contain a film drive servo and oblique servo. These servos are all mounted on one side of the camera 10 below the autobalance tube 64.

The captivator 60 or caging device includes a U-shaped frame 78 which cradles the camera 10 between two bracketing arms that are connected by a common cross member positioned to the rear of the camera 10. The ends of the two bracketing arms each terminate in the form of a yoke which embraces the outer end of the inner tube 14 and are secured to the inner tube by bolts 80a and 80b which pass through respective yokes and tube 14. The corners of the U-shaped frame member are supported by adjustable airframe attachment links 82a and 82b (FIGURE 2) which are arranged to provide self-aligning support for the U-shaped frame member 78 in spite of slight temperature expansion or contraction of the frame member, or the like. Thus, the U-shaped frame is supported purely by airframe structure.

The captivator 60 also includes a 400 c.p.s. 3 phase motor 84 which is used to drive a magnetic hysteresis clutch which, in turn, drives a crank through an output shaft (all not shown here) to operate a set of sliders 86a and 86b, uncaging the camera 10. The sliders 86a and 86b engage with a set of corresponding pins 88a and 88b which are mounted on shock absorbers, one on each side of the camera 10. The shock absorber pins 88a and 88b are respectively engaged by the captivator sliders 86a and 86b when the camera is caged. The output shaft which drives the crank that operates the set of sliders 86a and 86b is spring loaded through suitable gearing by a heavy coil spring in tube 90. This spring drives the sliders 86a and 86b together, caging the camera 10, whenever the magnetic clutch is de-energized or in the event of power failure to the 3 phase motor 84 which normally runs continuously. When the magnetic clutch is energized, the crank is rotated against the load of the heavy coil spring until a mechanical limit stop is contacted, and the clutch then slips until the end of the uncage part of the cycle. Each slider is preferably an aluminum casting that slides on nylon bushings on a pair of parallel ⅝ inch diameter steel shafts. Nylon snubbers are used on the surfaces of the slider contacting pins 88a and 88b to minimize shock load and wear. A spring loaded detent (not shown here) is also provided so that the crank, when manually turned to its extreme uncage position, can be locked in this position by pressing the spring loaded detent in to engage an end of a half segment gear which is affixed to and drives the output shaft. The force due to the heavy coil spring transmitted through the half segment gear against the detent, holds the detent in position. The captivator 60 serves to recenter the camera 10 after an exposure cycle, for example, and it locks the camera 10 to the airframe when stabilization is not in process. The captivator 60 will be further described later.

A normal sequence of operation is generally that as the aircraft flies over terrain where it is desired to photograph an area later along its flight path, film is first properly drawn in the camera 10 and it is then uncaged by energizing the magnetic hysteresis clutch which operates the crank and sliders of the captivator 60, permitting the camera 10 to rotate freely in all three axes about a point. Unless stabilized, the camera 10 would move uniformly at the same angular velocities possessed by the airframe at the instant of uncaging (laws of motion), to which the camera was caged. Upon uncaging, angular movement of the camera is stopped during a stabilization interval in which a viscous type of damping is provided to overdamp the camera 10 about each axis. Overdamping causes angular motion to crease in minimum time. The camera 10 is stopped with respect to gyro references, and the camera 10 is not influenced by aircraft motion. During the stabilization interval, angular motion about the roll, pitch and yaw axes cease. This is accomplished by three velocity type servos, one for each axis as was described earlier. Each servo channel includes a rate gyro which senses angular motion about its corresponding camera axis during the stabilization interval and during a later image motion compensation interval. The rate gyro output, after amplification, is fed to its channel torquer solenoid which exerts torque opposing the camera motion. Motion can be controlled within the resolution of the gyro which is about ⅓ milliradian per second, for example. By opposing angular motion with a torque proportional to angular velocity, a viscous type of damping is achieved. Since the camera is damped with respect to inertial space, it is not influenced by movement of the airframe.

At the same time that camera motion about all three axes is being stopped, the autobalance mechanism 56 is also put into operation during the stabilization interval as described before. After this interval, image motion compensation (I.M.C.) is started by introducing a pitch angular movement of the camera 10 to compensate for the forward motion of the aircraft, while roll and yaw motion of the camera 10 remain stopped. During the I.M.C. period, the camera 10 rotates about the pitch axis at a fixed rate which can be set by the pilot by manually adjusting a suitably calibrated potentiometer, for example, to introduce a rate command signal into the pitch servo channel. A pitch compensating angular motion of the camera 10 results since a velocity type servo can command any angular velocity, as well as zero rate. During the I.M.C. period, while the image of the area to be photographed is motionless, the camera shutter is operated by a pulse appearing during this interval. After shutter operation, the camera 10 can be captured and securely locked to the airframe again by de-energizing the magnetic clutch of the captivator 60. Power is also disconnected from the camera stabilized mount servo until the next cycle of operation. This completes a general description of a preferred embodiment and application of the invention.

The camera stabilized mount is shown in structural detail principally by FIGURES 3, 4, 5, 6 and 7. Additional supporting details of these figures are provided by FIGURES 3a, 3b, 3c, 3d, 4a, 4b, 5a, 5b, 6a, 6b, 6c, 7a, 7b, 7c, 7d, 7e, 7f, 7g, 7h, 7i and 7j. The three axis, flexure supported gimbal 46 is illustrated in detail by FIGURES 8, 9, 10, 11, 12, 13, 14 and 15. The pivot point for the mount is indicated in FIGURES 3, 4, 5 and 6 by a small circle having alternately shaded quadrants and is at the center of this circle. FIGURE 3 is a detailed side view of the camera stabilized mount which shows at the top a channel shaped adapter plate 92 having two parallel upright walls 92a. A side view of this adapter plate 92 can be seen in FIGURE 4 which shows the walls 92a being curved to conform with the surface of inner tube 14 and two holes 92b in each upright wall 92a near the ends are provided to accept the two bolts 30 which secure the adapter plate 92 to the flanges 26 and 28 of the inner tube 14 (see FIGURE 2). The adapter plate 92 is detailed in FIGURES 5a and 5b, and is shown properly installed in FIGURE 5. The adapter plate 92 rests on the upper peripheral surfaces of ball joint structure 32 which, in turn, stands on the top edges of the upper yoke of flexure supported gimbal 46 as shown in the partially sectional view of FIGURE 7. The ball joint structure 32 is shown in detail by FIGURES 7g, 7h, 7i and 7j. Four holes 94 forming a square are provided through this structure 32 and these holes 94 are arranged to coincide with four holes 96 in adapter plate 92 as shown in FIGURE 5a. These holes 94 and 96, in turn, are aligned with four threaded holes 98 located in the top edges of an upper body 100 of the flexure supported gimbal 46 (see the perspective of FIGURE 8). Four long bolts 102 (FIGURE 5) are used to secure the adapter plate 92 and ball joint structure 32 to the upper body 100.

The upper body 100 (FIGURE 8) is supported and connected through two sets of pitch axis flexures 104 to a middle body 106 of the gimbal 46 and the middle body 106 is, in turn, supported and connected by two sets of roll axis flexures 108 to a lower body 110. The lower body 110 has a raised center core section which is connected to a center support column structure through two sets of yaw axis flexures that hold the center support column structure parallel with the lower body core section. Each set of flexures comprises two thin metal strips mounted side by side and crossed so that the planes of the two strips would intersect at 90 degrees if the strips were widened and extended into each other. A strip is terminated in cubes at each end which can be integral with the metal strip. The strips can be other than metal, of course, and do not have to be integral with the end cubes, but can be suitably secured to them. This forms a pivot with negligible friction and a very small amount of spring compliance. The pitch and roll axis flexures are, for example, .016 inch thick, 7/16 inch wide and ½ inch long. The yaw axis flexures are the same width and length but have a tapering lengthwise cross section of .014 inch minimum thickness. The lengthwise cross sectional edges are elliptical and are .060 inch thick where they join with the end cubes. The top of the center support column structure has three threaded holes, triangularly spaced to coincide with three holes 112 bored in the center of the trunnion member 44 as shown in FIGURE 7b. FIGURES 7a, 7b and 7c fully illustrate the trunnion member 44. The ball joint structure 32 has three larger holes 114 (FIGURE 7i), triangularly spaced, to permit passage and installation of three bolts 116 (FIGURE 5) which secure the trunnion member 44 to the center support column structure as shown in FIGURE 7.

The cylindrical ring member 36 to which the end plates 42a and 42b (FIGURES 3 and 4) are affixed, is shown in detail by FIGURES 7d, 7e and 7f. Since the end plates 42a and 42b are respectively welded to the ends of the two trunnions of the trunnion member 44, and the cylindrical ring member 36 is fastened by bolts 38 (FIGURE 2) through tab flanges 40 to the outer tube 24, which is integral with the camera 10, the camera 10 is thus supported on the three axis, flexure supported gimbal 46 and a safety "ball joint" type support is provided by the lower inner edge of cylindrical ring member 36 and the flaring conical lower side of ball joint structure 32 (FIGURE 7).

The brackets that support the torquer solenoids are mounted between gimbal rings so that each solenoid torques only about the axis on which it is mounted. The pitch solenoid 48 (FIGURE 3) is fastened dependently to a bracket 118 which is, in turn, secured to an upper yoke 120. The upper yoke 120 is illustrated in detail by FIGURES 4a and 4b and is attached to the middle body 106 by cap screws 120a as shown in FIGURES 3, 4 and 6. The pitch solenoid 48 is connected to an upper bracket arm 122 (FIGURE 4) through a circular flexure 124. The upper bracket arm 122 is fastened to a lower side area 126 (FIGURES 7h and 7j) of structure 32 by screws 126a as shown in FIGURES 3 and 4. A differential transformer 128 is attached to bracket 118 and is connected to the upper bracket arm 122 by circular flexure 128a. This instrument 128 is provided so that indication of angular displacement of the camera 10 about the pitch axis can be obtained.

A bracket 130 which is detailed in FIGURES 3a and 3b is also attached to the upper yoke 120. Another bracket 131 detailed in FIGURES 3c and 3d is located below bracket 130 and is attached to the lower yoke 132. The lower yoke 132 is secured to the lower body 110 by cap screws 132a, and is shown in detail by FIGURES 6a and 6b. The roll solenoid 50 is secured dependently from bracket 131 and is connected to bracket 130 through a circular flexure 134. Thus, roll solenoid 50 is connected between the lower body 110 and middle body 106. The yaw solenoid 52 is mounted laterally to bracket 136 which is also fastened to the lower yoke 132 as is clearly shown in FIGURES 4, 5 and 6. The yaw solenoid 52 is connected by a circular flexure 138 to a bracket arm 140 which is attached to the bottom of the center support column member 142 (FIGURE 6). An elevational view of the bracket arm 140 is illustrated in FIGURE 6c. Thus, the yaw solenoid 52 is connected between the lower body 110 and the center support column member 142 which is secured to the trunnion member 44 that effectively supports the camera 10.

To show clearly how the solenoids are connected between gimbal rings, refernce can be made to FIGURES 8, 9, 10, 11, 12, 13, 14 and 15 which are detailed drawings of the flexure supported gimbal 46. The perspective of FIGURE 8 illustrates the general appearance of a preferred embodiment of a three axis, flexure supported gimbal. The three axis gimbal 46 comprises four main parts, an upper body 100, middle body 106, lower body 110 and a center support column member 142. The upper body 100 is a cylindrical ring-shaped structure having a large diametrical, circular cut 144 intersecting the side walls of the structure 100 partially below the top surface over two dependent side flanges 146a and 146b. This cut 144 provides clearance for the trunnions of the trunnion member 44. The four threaded holes 98 located around the top edges of the upper body 100 thread with bolts 102 (FIGURE 5) which secure the upper body 100 to ball joint structure 32 (and aircraft structure).

Two sets of countersunk holes 148a and 148b are also provided through the side flanges 146a and 146b as shown in FIGURES 11 and 13. These holes 148a and 148b accept screws 150a and 150b which thread into the upper cubical ends of the pitch axis flexures 104. These upper cubical ends are held by the screws 150a and 150b in the corners of the M shaped (FIGURE 11) lower edges of the side flanges 146a and 146b. Similarly, two other sets of holes 154a and 154b are drilled axially through the upper body 100 along the rim 90 degrees away from the holes 148a and 148b. These holes 154a and 154b provide through passage of screws 156a and 156b (FIGURES 9 and 14) which thread diagonally into the upper cubical ends 158a and 158b of the roll axis flexures 108. The upper body 100 has a large central opening 160 formed by boring parallel to the sides of the cylindrical upper body 100 partway down (FIGURES 14 and 15), spherically recessing the bottom and then reaming a rounded corner, square hole 162 (FIGURE 13) through the recessed area. This provides clearance for the raised core section of the lower body 110 and the center support column member 142.

The middle body 106 is also generally cylindrical conforming (for cooperation) with that of the upper body 100. The middle body 106 is essentially a solid round cylinder having an upper channel 164 cut thruogh the cylinder from the top surface and about halfway down the side, the bottom of the channel 164 forming a W shaped edge (FIGURE 11). A lower channel 166 is similarly cut through the middle cylinder, the height of the channel 166 being from the bottom surface of the cylinder running up approximately halfway to the top, the channel 166 ending in an M shaped groove (FIGURE 9). The lower channel 166 is oriented at right angles to the upper channel 164.

Countersunk holes in middle body 106 aligned with holes 154a and 154b accept the screws 156a and 156b (FIGURES 9 and 14) which thread into the upper cubical ends of the roll axis flexures 108, the cubical ends fitting into the corners of the top of the M shaped channel 166. Similarly, two pairs of countersunk holes 170a and 170b (FIGURES 10 and 15) accept screw pairs 172a and 172b, respectively, which thread into the lower cubical ends of the pitch axis flexures 104. The lower cubical ends of these flexures 104 are held down in the corners of the W shaped groove of the upper channel 164. Thus, the pitch axis flexures 104 connect the upper body 100 to the middle body 106 in an axis parallel to the upper channel 164.

The middle body 106 has two notched, flat areas 152a and 152b and a flat area 158 (FIGURES 9, 11 and 12). The areas 152a, 152b and 158 can be milled flat for the length of the middle body cylinder as shown in FIGURE 11, for example. Threaded holes 176a, 176b and 178 are provided so that the formed ends and middle of upper yoke 120 can be fastened to the middle body 106 by cap screws 120a (FIGURES 3 and 4).

The lower body 110 is generally a cross channel bar 180 (FIGURE 10) having an upper W shaped surface (FIGURE 9) and an upright center core 182 perpendicular to the bar as shown in FIGURES 12 and 14. The channel bar 180 has a cutout area 180a (FIGURE 10), the inner profile of the cut 180a having a joggled W cross sectional edge identical to the inner surface of the upright center core 182, which is a direct pillar extension from the channel bar 180 (see FIGURE 12). The lower body 110 also has two flat areas 184a and 184b in which are located two pairs of threaded holes 186a and 186b, the latter pair not visible (FIGURES 9, 10 and 11). The ends of lower yoke 132 are fastened to these holes 186a and 186b by the screws 132a as was shown in FIGURES 4 and 6.

Two pairs of countersunk holes 188a and 188b are drilled in the bottom of the channel bar 180 near the two ends to receive screws 190a and 190b which thread into the lower cubical ends of the roll axis flexures 108 (FIGURES 9 and 10). Thus, a roll axis parallel to the axis of the channel bar 180 is defined by the line of intersection of adjacent planes of the roll flexures 108. Two pairs of countersunk holes 192a and 192b are also drilled through the upright center core 182 of the lower body 110 as shown in FIGURES 12 and 15. Since FIGURE 12 shows only the lower pair of yaw flexures, FIGURE 14 can be additionally referred to for exact location of the threaded holes 192a. Screw pairs 194a and 194b respectively fasten the upper and lower cubical ends of the yaw axis flexures 196 to the upright center core 182.

The center support column member 142 is a channel bar which has a W shaped inner cross sectional edge in which the ends of the W are bent inwards, as can be seen in FIGURES 12 and 13. Two pairs of countersunk holes 198a and 198b are drilled through the center support column member 142 as shown in FIGURES 12 and 15. As before, FIGURE 14 can be used to determine the exact location of holes 198a which are on the same levels as holes 192a. Similarly, two pairs of screws 200a and 200b thread into the upper and lower cubical ends of the yaw axis flexures 196 through holes 198a and 198b, respectively. The yaw axis flexures 196 thus connect (and support) the center support column member 142 to the lower body 110. Four of five threaded holes 202 tapped in the bottom of the center support column member 142 (FIGURES 10 and 11) accept cap screws 204 (FIGURE 6) which secure the bracket arm 140 to the center support column member 142. The three threaded holes 206 (FIGURE 13) in the top of the center support column member 142 receive the three bolts 116 which secure the trunnion member 44 to it.

Thus, a yaw axis which is normally parallel to the axis of the center support column member 142 is defined by the intersection of the planes of the crossed yaw axis flexures 196a and 196b.

The captivator 60 is shown in greater detail in FIGURES 16, 17, 17a, 17b and 17c. FIGURE 16 is a front view of the captivator 60 (in back of camera 10) showing the mounting of 3 phase motor 84 with a housing 208 which contains a magnetic clutch and suitable gearing to drive the output shaft connected to operate the captivator sliders 86a and 86b. Tube 90 houses a heavy coil spring 210 which is shown in a disconnected condition in FIGURE 18.

The heavy coil spring 210 is normally somewhat compressed when cable 212 is connected to end plug 214. The 3 phase motor 84 drives a magnetic hysteresis clutch 214 through a 5 to 1 spur gear reduction 216. Pinion 218 keyed to the output shaft of clutch 214 drives an output shaft 220 through conventional 141 to 1 reduction gearing 222. The reduction gearing 222 drives a half segment gear 224 which is mounted and affixed to the output shaft 220, as shown. Reduction gearing 222 includes a bevel gear 220a which meshes with the pinion 218, a small diameter spur gear which is mounted and secured to the same (bearing supported) shaft 220b as the bevel gear 220a (not visible under bevel gear 220a) meshes with a larger diameter spur gear 220c on another bearing supported shaft 220d. Another small diameter spur gear 220e is affixed to the latter bearing supported shaft 220d and meshes with another larger diameter gear 220f mounted and secured to a large, bearing supported shaft 220g which also mounts (underneath) a small diameter spur gear that meshes with the half segment gear 224. The cable 212 is fastened to the output shaft 220 and can be wound up around the shaft 220 as the shaft 220 is rotated by the gearing 222 driving the half segment gear 224. This, of course, further compresses the heavy coil spring 210.

The half segment gear 224 is shown in FIGURE 18 with one end (which can be engaged by the spring loaded detent) braced against an end of a mechanical limit stop 226 which is an rectangular shaped nylon block. The other end of the half segment gear 224 engages with the other end of the rectangular limit stop 226 when driven to this position by clutch 214 and gearing 222. The clutch 214 slips in this condition as stated before. A spring loaded detent 228 (FIGURE 16) is positioned near the output shaft 220, the end of which can be manually turned by a suitable wrench. A selenium rectifier 230 (FIGURE 18) derives 50 volts D.C. from a 115 volts A.C. supply for energizing the clutch 214. The circuit is shown in FIGURE 19 wherein the 115 volts A.C. is provided only during the uncage period. A filter capacitor 232 is connected across the supply lines after the rectifier 230. To slow the release of the clutch 214, it is shunted with a capacitor 234 in series with a resistor 236. Without this feature, the captivator sliders 86a and 86b would be driven closed very rapidly by the heavy coil spring 210 thereby introducing undesirable transient vibrations in the camera 10.

FIGURE 17 is a perspective which illustrates the general construction of the captivator. The U-shaped frame 78 is clearly portrayed and it can be seen that the common cross member 238 connecting the bracketing side arms 240a and 240b mounts a double acting crank 242 which actuates sliders 86a and 86b. The crank and sliders are shown in detail by FIGURES 17a, 17b and 17c which are enlarged, fragmentary views of the captivator structure. Slider 86a is shown in FIGURE 17a, and slider 86b is identical to it. The slider 86a slides on the parallel steel shafts 244, the ends of which are secured to the outer ends of the connecting brackets 246a and 246b. The end brackets 246a and 246b are bolted to the cross member 238 by bolts secured by nuts 248. Clearance between the skin of cross member 238 and the slider 86a riding on shafts 244 is provided by suitable thickness of the end brackets 246a and 246b. The slider 86a is a closed yoke having a base rod 250 which can slide back and forth through a hole in end bracket 246a mounting a nylon bushing therein. The other end bracket 246b mounts a nylon pad 252 for cushioning the top of the slider 86a. Nylon snubbers 254 are provided on the inside edges at the top of the yoke 86a.

The end of rod 250 is pin jointed to a connecting rod 256, the pin 258 passing perpendicularly through the in-line axes of rods 250 and 256 and is perpendicular to the plane of the web of cross member 238. The connecting rod 256 can rotate about pin 258 over a wide angular spread. The connecting rod 256 is connected to the crank 242 as shown in FIGURE 17b. The crank 242 comprises the output shaft 220 as a crankshaft which is keyed to rotate a double ended crankarm 260. The two ends are respectively connected to ends of rocker arms 262a and 262b through pins 264a and 264b which are mounted in bearings 266 as shown in FIGURE 17c. It can be seen in FIGURE 17c that the crankarm 260 is deeply channeled at both ends to receive the ends of the hook shaped rocker arms 262a and 262b. The other ends of the rocker arms 262a and 262b have holes drilled in them in line with the axis of rod 250 and the end of the connecting rod 256, for example, is inserted into the hole in rocker arm 262b and secured in place by pin 268b (pin 268a is similarly used with rocker arm 262a). Thus, as the crank arm 260 is rotated clockwise, the rocker arms 262a and 262b pivot respectively with their connecting rods about their pivot points as, for example, at pin 258 where the connecting rod 256 rotatably connects with the base rod 250 of slider 86a. After the crank arm 260 is rotated 90 degrees and passes top dead center, the lateral translatory motion is, of course, transmitted to the sliders 86a and 86b, moving them outwards. This motion releases the shock absorber pins 88a and 88b which are mounted on each side of camera 10 (FIGURES 2 and 16), uncaging the camera 10.

The assembly including absorber pin 88a mounted as shown in FIGURE 1 is enlarged in FIGURES 20a and 20b. An accurate representation of the shock absorber in true proportion is provided by FIGURES 20a, 20b and 21. The shock absorbers absorb the shock that would otherwise result from impact of the sliders 86a and 86b contacting the pins 88a and 88b on caging of the camera 10. Each shock absorber includes a shock absorber pin, such as 88a, swivel mounted in a housing 270 on a toroidal bearing 272 (FIGURE 21) carried by the housing 270. The pin 88a has a 15 degree base cone at the inner end which is engaged by an end of a spring loaded plunger 274. The plunger 274 is urged forward by a spring 276 encircling the stem of the plunger 274 inside a cylindrical retainer housing 278 which is threaded into the left end of housing 270. The spring loaded plunger 274 recenters the pin 88a after release from deflection of the pin 88a; damping being provided by mechanical friction between the pin 88a and plunger 274 ends. A pliable O-ring 280 is carried in a channeled groove on the inside end of the pin 88a and cushions the pin 88a at maximum deflection when contact is made with the side of the housing 270. The cushioning effect of the shock absorbers can be varied by adjusting the spring pressure against the plunger 274. This can be done by screwing the retainer 278 in or out to increase or decrease the spring 276 pressure on the plunger 274. Spring pressure should be increased if the recentering transients are not damped out quickly enough (by the start of another operational cycle) and pressure should be decreased if the camera 10 is not smoothly accelerated and decelerated on uncaging and caging, respectively. A ring collar 282 can be secured to the camera 10 skin by means of a screw (not shown) which passes through the skin threading with threaded hole 282a. The retainer housing 278 can be firmly held in position by set screws 282b (FIGURE 20a) through collar 282.

The autobalance assembly 56 is shown in greater detail by FIGURES 22 and 23. The autobalance weight or slug 284 is detailed in FIGURE 23a. The autobalance tube 64 carries the weight 284 which is actuated by D.C. motor 66 through a system of pulleys. A small tube 286 mounted inside to the top of autobalance tube 64 serves as a conduit for wiring and also as a guide rail which fits in the groove 288 channeled in the top of the weight 284. The cylindrical weight 284 has a hole 290 drilled through it parallel to the axis of the weight 284. Two other holes 292 and 294 are also drilled parallel to the cylindrical weight's axis respectively into the left and right ends (FIGURE 23a) but are not through holes like hole 290. Small diameter holes 296 and 298 are drilled diametrically through the axes of holes 292 and 294, respectively, near the bottom of the holes and small pins are inserted which span the diameter of each hole 292 and 294. Channeled slots 300a and 302a each mount roller bearings 304 on axle pins which pass perpendicularly through the channeled slots by way of slanting holes 306a and 308a. Two similar channeled slots are located on the other side of the weight 284 to mount two other roller bearings on axle pins such that the weight 284 stands on the edges of four roller bearings. The weight 284 rolls on the four roller bearings 304 and is aligned and guided by the small tube 286.

A tension spring 310 housed in hole 292 is hooked on one end to a pin in hole 296 and the other spring end is tied to line 312, which passes over pulley 314 (FIGURE 23), wrapped around the pulley output shaft of D.C. motor 66 and then looped over pulley 316. The line 312 is next threaded through the hole 290, continues down the length of tube 64 and then looped around a right end pulley 318 and brought back to weight 284 and tied to a pin in hole 298 as shown in FIGURE 22. A closed, endless and spring-tensioned loop is formed for moving the weight 284 back and forth in autobalance tube 64 according to the direction of rotation of motor 66. Limit switches 320a and 320b, when actuated by weight 284, are provided at both ends of tube 64 to cut off motor 66. Manual operation can be accomplished through two auxiliary switches 68 at the right end of tube 64.

A functional block diagram of a preferred servo for single axis stabilization is shown in FIGURE 24. This diagram is applicable to any of the three servo channels controlling angular motion about the roll, pitch or yaw axes of the camera stabilized mount. Gyro signal $E_g$ proportional to W, the angular velocity sensed by the gyro about the axis controlled, is mixed with $E_c$, a voltage analogue of a desired angular rate (which is zero except for the pitch axis during the I.M.C. interval), and a mixed output signal is obtained and amplified by an amplifier having gain $K_a$ and applied to a solenoid producing torque at the torque/current ratio $K_t$ of the solenoid. The motion of the camera, having inertia J, is referenced to the air frame, and yields a spring load torque $T_c$ according to camera compliance $K_c$. The camera inertia load torque $T_j$ combined with the spring load torque $T_c$ is the torque opposed by solenoid torque $T_s$. If $E_c$ is zero, the angular velocity W about the axis controlled is zero, but if $E_c$ is set at some value, solenoid torque $T_s$ exceeds the opposed torque and produces a constant angular velocity W about the controlled axis.

The single axis rate gyros 62 which sense angular motion for the camera 10 are conventional devices which each includes a gimbal mounting an electrically driven gyroscopic rotor perpendicularly to the plane of the gimbal ring, a torque generator and a signal generator, all hermetically sealed in a case completely filled with a viscous fluid. The gimbal ring is supported on diametrically opposing end shafts which forms an output axis perpendicular to the spin axis of the gyroscopic rotor. The armatures of the torque generator and the signal generator are respectively each mounted on an opposing end shaft of the gimbal ring. For rate gyro application with HIG-5 integrating type gyros, the signal generator output is amplified externally, and this amplified signal is used to drive the torque generator. In this manner, the torque developed by the torque generator is proportional to the angular displacement of the gimbal (output axis) shafts.

A preferred gyro loop block diagram is shown in FIGURE 25. When the gyro senses angular motion, a precession torque is produced about the output axis which causes angular displacement of the signal generator armature off null position to produce an output signal. This output signal is coupled by electrostatically shielded isolation transformer $T_1$ to a high gain A.C. preamplifier $A_1$ and the amplified signal is demodulated by a demodulator which is a transistor chopper producing synchronous rectification of the preamplifier $A_1$ output. The demodulated signal is amplified by D.C. amplifier $A_2$ comprising direct coupled push-pull class B emitter followers, and applied to the control field of the torque generator. The torque generator pattern field is operated at a known current (7 ma.), and since the torque output of the torque generator is proportional to the product of the pattern field and control field currents, the applied control field current is proportional to the rate input to the gyro. The resulting torque produced by the torque generator is such to bring the gyro and signal generator armature back into null. The angular displacement of the signal generator is kept very low because of the high loop gain in the system.

Since the D.C. resistance of the torque generator is accurately known, the voltage across the torque generator (control field) is sampled for the rate output of the sensing gyro. The current in the torque generator provides an accurate measure of the angular rate if the loop gain is kept high. The rate output signal is suitably applied to a torquer solenoid to drive the camera in such a direction to oppose any motion sensed by the gyro. The block diagram depicted circuit of FIGURE 26 (for the pitch channel) illustrates a preferred manner in which this is done. The conventional gyro 62 is represented diagrammatically. The servo loop as shown in FIGURE 25 can be seen in FIGURE 26 and includes pitch gyro amplifier 322, and part of torquer amplifier 324. The output signal from the pitch gyro amplifier 322 is passed through a conventional balanced parallel-T, low pass filter 326 to modulator 328. An I.M.C. command can be provided to another modulator 330 as indicated. The command is simply in the form of a direct voltage which is derived off a manually adjustable and calibrated potentiometer connected across 90 volts D.C., for example. The modulated outputs of modulator 328 and 330, which are conventional chopper modulators, are added and applied to preamplifier 332 through a gain control potentiometer 334. The preamplifier 332 drives two magnetic amplifiers 336a and 336b and the magnetic amplifiers 336a and 336b each feeds one winding of the pitch control solenoid 48. These two windings oppose each other and if an equal current flows in both windings there is no force from the solenoid. The magnetic amplifiers 336a and 336b are conventional and of the half wave reset type. Due to the reset type of action, these magnetic amplifiers 336a and 336b are phase sensitive and act as their own demodulators. The phasing of the preamplifier 332 output to the magnetic amplifiers 336a and 336b is such that one will operate on one phase and the other on the opposite phase. Thus, one magnetic amplifier 336a drives the "push" coil and the other 336b drives the "pull" coil of the solenoid 48. The solenoid 48 drives the camera 10 in such a direction as to oppose any motion sensed by the gyro 62.

The roll and yaw channels are similar except that the I.M.C. command signal is zero and, consequently, demodulator 330 can be omitted. In the pitch channel, image motion compensation is accomplished by feeding an I.M.C. voltage into chopper modulator 330 and adding this to the output of the stabilizing chopper modulator 328. The solenoid 48 will then drive the camera 10 until the gyro 62 output is equal and opposite to the command, at which time there will be no signal to the preamplifier 332. Thus, instead of nulling to zero rate, the system will null to a rate which produces a voltage equal and opposite to the command voltage. This means that when the system is nulled, the camera 10 will be moving at a given I.M.C. rate about the pitch axis.

The preamplifier $A_1$ connecting with isolation transformer $T_1$ is identical in detail circuitry to preamplifier 332, and their circuitry is shown in FIGURE 27. The torquer amplifier 324 is detailed in FIGURE 28 and one of the magnetic amplifiers 336a and 336b is shown in FIGURE 29. These circuits are generally conventional and will be briefly described. The preamplifiers each comprises an input stage which is a transistorized equivalent of a cathode follower and includes a capacitor C13 used to suppress parasitic high frequency oscillations. Resistor R5 and capacitor C12 forms a decoupling network which also provides additional power supply filtering. Resistors R4 and R2 form a bleeder network which provides bias for the first transistor Q1. Capacitor C2 is a coupling capacitor and capacitor C2 couples the A.C. signal from the emitter to the bias network center which feeds the base of Q1. By keeping the center of the bias network at the same A.C. potential as the emitter, the A.C. impedance of resistor R1 is effectively increased by a factor of approximately 10. This is used to present a high input impedance for the first transistor Q1 which prevents the amplifier from loading the signal source.

The second stage of the preamplifier is a common emitter amplifier Q2 which is directly coupled to the emitter of transistor Q1. Resistor R7 in the emitter circuit of Q2 provides some A.C. gain stability. This unbypassed resistor provides negative current feedback in the Q2 stage. Resistor R8 provides negative current feedback at the D.C. level, and since it is 28 times as large as R7, it reduces the D.C. gain of the stage to approximately 3, for example. This resistor R8 also determines the D.C. operating point for transistor Q2. Capacitor C5 bypasses this resistor R8 in order to obtain a high A.C. gain for the stage. Resistor R17 is the collector load resistor for the stage and capacitor C10 is used to cut off the higher frequencies which would only add to noise in the system.

Capacitor C9 is a coupling capacitor to the third stage, which is also a common emitter amplifier. Resistors R6 and R18 form a bleeder bias network for transistor Q3, and resistor R9 is used to increase input resistance and provide some gain stability. Resistor R10 provides D.C. degeneration and temperature stability, and capacitor C6 bypasses resistor R10 for A.C. signals. Resistor R11 is the collector load resistor for this stage and capacitor C7 is the coupling capacitor to the next stage, which is a common emitter amplifier. This stage is the driver for a push-pull output. Resistors R12, R13, R14 and R15 perform the same functions as similar resistors in the preceding stage. The gain can be varied by increasing the A.C. impedance in the emitter circuit of transistor Q4. The collector circuit of Q4 includes the primary of a driver transformer T10 which is resonated by capacitor C11 to carrier frequency Resistor R19 loads the resonant circuit reducing its Q to broaden the resonance. This improves waveform considerably when the amplifier is overdriven, and prevents strong spikes from occurring.

The output stage is a push-pull class B amplifier including transistors Q5 and Q6. The use of a class B stage reduces dissipation in the transistors when full output is not required. Resistors R22 and R16 form a bias network for the stage. This places a small forward bias on Q5 and Q6 to eliminate crossover distortion and thus prevents a small dead spot from occurring at null.

Resistors R20 and R21 provide bias stability and some degeneration. The output of Q5 and Q6 is powered from a separate collector supply identified +30 v. and +30 v. return in order to secure good decoupling.

The torquer amplifier 324 is shown in detail in FIG-28, and includes a transistor chopper (Q1', Q2', Q3', and Q4') which is used as a demodulator, a push-pull emitter follower circuit (Q13, Q14, Q15 and Q16) for driving the torquer (torque generator) of the gyro 62, and a modulator transistor chopper (Q5', Q6', Q7 and Q8) after filtering by filter 326. An additional modulator transistor chopper (Q9, Q10, Q11 and Q12) for converting I.M.C. direct voltage to 400 c.p.s. is also provided for the pitch channel. The output of the I.M.C. modulator 330 is added to the torque generator modulator 328 by means of a resistive adding network (R7' and R8') and fed to preamplifier 332. Output 1' (terminals 11 and 12) is used for the pitch channel and output 2' (terminals 10 and 11) is used in the other two channels. Thus, transistors Q9, Q10, Q11 and Q12, capacitor C5' and resistors R7' and R8' can be omitted from the torquer amplifiers for the roll and yaw channels.

Transistors Q1' and Q2', P-N-P types, for example, are connected back to back and comprise a single pole, single throw switch. When the coil end having a dot is negative relative to the other end, the transistors Q1' and Q2' are forward biased and the switch is closed. When the alternating switching voltage is reversed, both transistors Q1' and Q2' are back biased and no current flows. The transistors are used in inverted connection; the normal collector junction is used as the emitter and the normal emitter junction is used as a collector. In normal operation the transistors are driven from cutoff to saturation, requiring little driving voltage, to produce substantially square wave switching. Two of these single pole, single throw switches are combined with a common driver transformer to make a complete SPDT chopper. The A.C. input is converted into a double ended, polarity reversible D.C. signal which reverses in polarity with the phase of the incoming signal. This signal is alternately connected to filter capacitor C1' and the bases of emitter follower Q13 and Q14 then to filter capacitor C2' and the bases of emitter follower Q15 and Q16. Each emitter follower uses two transistors in parallel to provide increased power output.

The two emitter followers feed the torque generator control field of gyro 62, and are connected in a bridge circuit in which the control field of the torque generator is connected between the emitters of the two emitter followers. The SPDT chopper acts as a synchronous rectifier. For one phase of input A.C. signal, the rectified output across the capacitors C1' and C2' will be positive on one capacitor and negative on the other with respect to the +30 v. line. The emitter follower with the negative signal will follow the input and the emitter follower with the positive signal will be cut off and its emitter will remain at zero, measured with respect to the +30 v. line.

The stabilization chopper comprising transistors Q5', Q6', Q7 and Q8 samples the voltage across the torque generator control field through filter 326. The chopper has two "contacts" connected to each side of the control field through filter 326, and an "arm" connected through a coupling capacitor C4' to preamplifier 332. Thus, a D.C. or low frequency A.C. input is converted to a modulated 400 c.p.s. output, for example. This modulated output reverses phase as the polarity across the control field of the torque generator reverses. In the case of the pitch channel, a similar additional chopper comprising transistors Q9, Q10, Q11 and Q12 converts an I.M.C. direct voltage into a 400 c.p.s. alternating voltage. This signal is combined with the A.C. signal from capacitor C4' through a resistance adding network comprising resistors R7' and R8'. When these two alternating voltages are equal and opposite, they cancel and no output signal is fed to the preamplifier 332 in the pitch channel. The system will seek a null where these two signals cancel and can only do this by moving the camera 10 at such a rate that the gyro 62 output as measured across its torque generator control field equals the I.M.C command voltage. Thus, a constant D.C. input to the I.M.C. chopper will comand a constant rate on the camera 10.

The output of preamplifier 332 is applied to a pair of magnetic amplifiers 336a and 336b, for example, through transformer T3 as shown in FIGURE 30. A magnetic amplifier is illustrated in detail in FIGURE 29. Two units are used in each channel and the upper end of the secondary of transformer T3 is connected to input terminal 1 of magnetic amplifier 336a and to input terminal 15 of magnetic amplifier 336b while the lower end of the secondary is connected to input terminal 15 of magnetic amplifier 336a and to input terminal 1 of magnetic amplifier 336b. This interchanging of input to a magnetic amplifier with respect to the other permits one to conduct for one phase of the input signal and the other to conduct for the other phase of the signal. One magnetic amplifier is connected to the "push" coil of the solenoid 48 and the other to the "pull" coil. Thus, the direction of force is dependent upon the phase of the input signal. The magnetic amplifiers used are full wave devices obtained by using two half wave sections and feeding them from the center tapped preamplifier output transformer T3. The control cycle for one half wave section occurs during the load cycle of the other, and vice versa. If, during the control half cycle, the transistor Q1a and its conjugate (transistor having base connected to input terminal 15 through R5a) are held cut off by the phase of their input signal being opposite, with respect to line, neither half wave sections of a magnetic amplifier conducts and no output is obtained. The notation $\phi 1$ and $\phi 2$ after the line 13 v. and 26 v. legends refer to upper and lower halves of a center tap grounded supply transformer coil and do not mean a two phase supply.

The general operation of the camera stabilized mount can now be described with reference to FIGURE 30. During a cycle of operation, the programmer 338, which is a stepping switch, makes, for example, 11 steps as indicated. Film can be drawn in the camera 10 during the first three steps and then during the next three steps the autobalance relay K3 is energized together with the uncaging relay K2. A relay K1 is connected across the pitch solenoid 48 coils as shown and is a double pole, center balanced two position relay. When K2 is energized, the magnetic amplifier preamplifiers are energized by completion of the circuit of the +30 v. return line. At the same time, the captivator clutch 214 is energized by rectified 115 v. A.C. power. The uncaged camera 10 will be stabilized and if a static unbalance drift caused by uneven transport of film is sensed in the pitch channel, the poles of relay K1 will be actuated either up or down according to the direction of camera drift. Since relay K3 is actuated, +28 volts is suitably applied through actuated relay K1, manual switches 68 and limit switches 320a and 320b to autobalance motor 66, moving the weight 284 in tube 64 to compensate for unbalance in the camera 10. The relay K1 can be a time delay relay to delay operation of the autobalance until steady state condition is reached.

The autobalance function is discontinued when I.M.C. is commenced. The camera 10 is, however, kept uncaged, of course. Relay K4 is energized which breaks the +28 volts circuit to the autobalance circuit and removes a short which allows the I.M.C. signal to be applied to the pitch torquer amplifier 324. A camera shutter pulse is then applied during the tenth step, and the operation is completed by the eleventh step, when the camera 10 is caged and the system generally de-energized. Thus, a mount is provided in which a camera is supported by a three axis, low friction torque gimbal in which the center of gravity of the camera is coincident with, or very close to the pivot point of the gimbal. Controlling means including rate gyros and suitable servos and power supplies are used to govern torquer solenoids suitably attached to the gimbal between gimbal rings. A captivator or mechanical cager locks the camera to the airframe as required when the camera stabilized mount is not in operation. The capivator releases the camera in operation so that it is free to pivot about the gimbal. The rate gyros sense any angular movement of the mount, and through the servos, signal an appropriate torquer solenoid to exert a torque on the mount so as to oppose the angular movement of the mount. Normal operating angular movements are only fractions of a degree and a maximum range of ±3 degrees, for example, is intended. However, the flexure gimbal can be capable of movement to approximately ±15 degrees without difficulty about each axis. The limitation here is due only to flexure elasticity.

It is, of course, not required that the controlling means command zero angular rate, but a rate signal can be put into the system such that the mount will move in such a manner to compensate for translation of the aircraft mounting the camera, and thus provide for image motion compensation. Similarly, it is not required that the system be used on all three axes of rotation but that the system can function as a one or two axis stabilized mount wherein the gimbal would allow the mount one or two degrees of freedom, respectively. It is also apparent that the mount is ideally suited to support two cameras side by side with the mount generally located between the cameras. Film in the cameras can move in opposing directions to maintain equal weight distribution. An autobalance tube and weight can also be provided between the two cameras running parallel with film movement for precise control or where only one camera is in use.

It is to be understood that the particular embodiment of our invention described above and shown in the attached drawings is merely illustrative of and not restrictive of the broad invention, and that various changes in design, structure and arrangement may be made without departing from the spirit and scope of the broader of the appended claims.

We claim:

1. A stabilization system for controlling cameras, comprising: a three axis, flexure supported gimbal for mounting a camera on a pivot point; torquer solenoids connected directly and gearlessly to said gimbal to apply instantaneous torque respectively about the three axes of said gimbal, each of said torquer solenoids having a linear tractive force and displacement characteristic over its working stroke; rate gyros for sensing camera motion respectively about the three axes of said gimbal and responsively generating rate signals; autobalance means energizable for balancing the camera; servo amplifier means for amplifying said rate signals and energizing said torquer solenoids to normally oppose the camera motion, said servo amplifier means additionally energizing said autobalance means directionally according to phase of the rate signal from a rate gyro; means energizable for introducing an adjustable magnitude command signal into said servo amplifier means to be nullified by a generated rate signal whereby the camera can be moved about an axis at a rate corresponding to the command signal magnitude; means normally caging the camera; and programmer means for energizing said autobalance means to balance the camera and said caging means to uncage the camera, then de-energizing said autobalance means and energizing said means for introducing an adjustable magnitude command signal into said servo amplifier means and operating the camera for an exposure, and finally de-energizing said means for introducing an adjustable magnitude command signal and said caging means to cage the camera.

2. The invention according to claim 1 wherein said autobalance means includes a center balanced, two position relay connected responsively to said servo amplifier means, a slug positionable in a tube mounted to the camera, and a motor responsively connected to said relay for moving said slug directionally according to the energization of said center balanced, two position relay.

3. The invention according to claim 1 wherein said servo amplifier means includes respective channels for said rate gyros, each channel comprising a demodulator for demodulating the rate signal from its corresponding rate gyro, a direct current amplifier for amplifying the demodulated signal and applying the same back to null said corresponding rate gyro, a modulator, a filter for filtering the demodulated signal and applying the filtered signal to said modulator, and amplifier means including half wave resetting magnetic amplifiers responsively connected to said modulator for driving the channel torquer solenoid, and one of said channels additionally includes another modulator for modulating the introduced adjustable magnitude command signal, and an adder for adding the modulated signals of said modulators of the one channel, said amplifier means including resetting magnetic amplifiers of the one channel being responsively connected to said adder.

4. A stabilized mount for cameras, comprising: a three axis, flexure supported gimbal including a central column member and a normally upper body; a cylindrical ring member attaching a camera to be mounted by said gimbal on a pivot point; a cross member securing said ring member to said column member; a ball joint structure having sloping sides connecting said upper body to fixed structure, said ball joint structure being positioned within said ring member and operatively spaced apart therefrom, whereby the sloping sides of said ball joint structure can engage said ring member to support the camera in the event of flexure failure; torquer solenoids connected directly and gearlessly between gimbal rings to apply instantaneous torque respectively about the three axes of said gimbal, each of said torquer solenoids having a linear tractive force and displacement characteristic over its working stroke; and control means including a velocity servo having rate gyros for sensing camera motion respectively about the three axes of said gimbal and responsively generating rate signals for energizing said torquer solenoids to normally oppose the camera motion, whereby the camera is stabilized to zero velocity about all three axes.

5. The invention according to claim 4 including, in addition, means for introducing an adjustable magnitude command signal into said velocity servo to be nullified by a generated rate signal, whereby the camera is moved about an axis at a rate corresponding to the command signal magnitude.

References Cited in the file of this patent

UNITED STATES PATENTS

| | | |
|---|---|---|
| 1,585,484 | Gasser | May 18, 1926 |
| 1,586,071 | Cooke | May 25, 1926 |
| 1,731,776 | Henry | Oct. 15, 1929 |
| 1,942,604 | Kennedy | Jan. 9, 1934 |
| 1,953,304 | Lutz | Apr. 13, 1934 |
| 2,198,920 | Robinson | Apr. 30, 1940 |
| 2,446,096 | Moore | July 27, 1948 |
| 2,490,628 | Isserstedt | Dec. 6, 1949 |
| 2,506,095 | Mantz | May 2, 1950 |
| 2,523,267 | Aschenbrenner et al. | Sept. 26, 1950 |
| 2,620,669 | Braddon | Dec. 9, 1952 |
| 2,630,983 | Horne et al. | Mar. 10, 1953 |
| 2,756,598 | Hammond | July 31, 1956 |
| 2,899,882 | Wylie et al. | Aug. 18, 1959 |

OTHER REFERENCES

Photographic Engineering "Torquer Controlled Mounts for Aerial Cameras," vol. 6, No. 4, 1955, pages 231–236 cited.